(12) United States Patent
Taniguchi et al.

(10) Patent No.: US 10,197,867 B2
(45) Date of Patent: Feb. 5, 2019

(54) LIQUID CRYSTAL DISPLAY DEVICE WITH MAIN COLUMNAR SPACERS AND SUB COLUMNAR SPACERS HAVING DIFFERENT AREA DENSITIES

(71) Applicant: MITSUBISHI ELECTRIC CORPORATION, Tokyo (JP)

(72) Inventors: Toshiro Taniguchi, Kumamoto (JP); Hideo Yabiku, Kumamoto (JP); Toshiaki Fujino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 14 days.

(21) Appl. No.: 15/291,289

(22) Filed: Oct. 12, 2016

(65) Prior Publication Data

US 2017/0031196 A1    Feb. 2, 2017

Related U.S. Application Data

(62) Division of application No. 13/951,332, filed on Jul. 25, 2013, now abandoned.

(30) Foreign Application Priority Data

Aug. 8, 2012  (JP) ................. 2012-176236

(51) Int. Cl.
*G02F 1/1339*  (2006.01)
*G02F 1/1341*  (2006.01)
(Continued)

(52) U.S. Cl.
CPC ......... *G02F 1/13394* (2013.01); *G02B 5/201* (2013.01); *G02B 27/2214* (2013.01);
(Continued)

(58) Field of Classification Search
CPC combination set(s) only.
See application file for complete search history.

(56) References Cited

U.S. PATENT DOCUMENTS

2003/0112405 A1   6/2003  Kim et al.
2003/0169474 A1   9/2003  Adachi
(Continued)

FOREIGN PATENT DOCUMENTS

CN    11-133432    *  5/1999  ........... G02F 1/1339
JP    H11-133432 A     5/1999
(Continued)

OTHER PUBLICATIONS

An Office Action; "Notification of Reason(s) for Refusal," issued by the Japanese Patent Office dated Feb. 2, 2016, which corresponds to Japanese Patent Application No. 2012-176236 and is related to U.S. Appl. No. 13/951,332; with English language translation.

*Primary Examiner* — Lauren Nguyen
(74) *Attorney, Agent, or Firm* — Studebaker & Brackett PC

(57) ABSTRACT

A liquid crystal display device of the present invention includes a liquid crystal interposed between a CF substrate that is an ultra-thin glass substrate and a TFT substrate, and a seal pattern having an injection port. Spacer structures are arranged such that the area density thereof is higher in a corner portion farther from the injection port than in a corner portion closer to the injection port.

5 Claims, 13 Drawing Sheets

(51) Int. Cl.
 *G02F 1/1333* (2006.01)
 *G02B 6/02* (2006.01)
 *G02B 5/20* (2006.01)
 *G02B 27/22* (2018.01)

(52) U.S. Cl.
 CPC .......... *G02F 1/1339* (2013.01); *G02F 1/1341* (2013.01); *G02F 2001/13396* (2013.01); *G02F 2001/133302* (2013.01)

(56) References Cited

U.S. PATENT DOCUMENTS

| | | |
|---|---|---|
| 2006/0152668 A1 | 7/2006 | Jang et al. |
| 2008/0055235 A1 | 3/2008 | Tanaka |
| 2011/0149218 A1* | 6/2011 | Nakayama .............. B32B 37/02 349/106 |
| 2013/0050619 A1* | 2/2013 | Kim ................... G02F 1/13394 349/106 |
| 2013/0128212 A1 | 5/2013 | Yabiku et al. |

FOREIGN PATENT DOCUMENTS

| | | |
|---|---|---|
| JP | 2003-195318 A | 7/2003 |
| JP | 2003-255368 A | 9/2003 |
| JP | 2003-337550 A | 11/2003 |
| JP | 2011-128547 A | 6/2011 |
| JP | 2011-221318 A | 11/2011 |
| JP | 2012-093530 A | 5/2012 |

* cited by examiner

F I G. 2
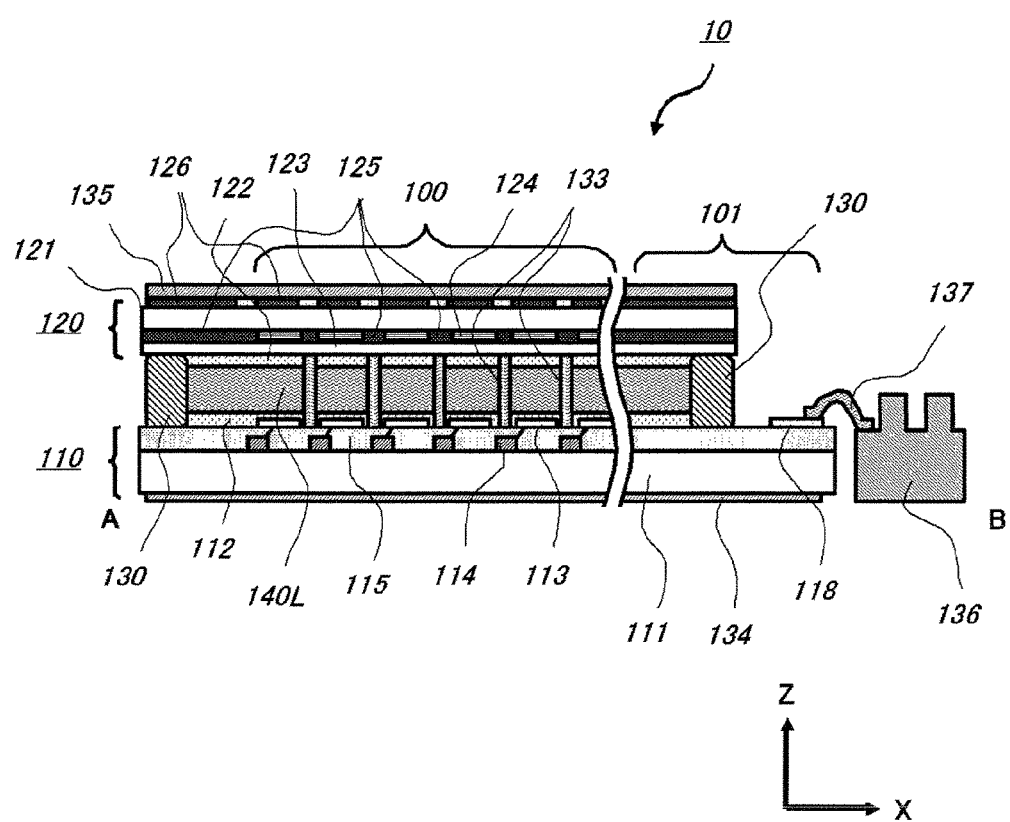

LIQUID CRYSTAL DISPLAY DEVICE WITH MAIN COLUMNAR SPACERS AND SUB COLUMNAR SPACERS HAVING DIFFERENT AREA DENSITIES

CROSS-REFERENCE TO RELATED APPLICATIONS

The present application is a Divisional of and claims priority to U.S. patent application Ser. No. 13/951,332 filed Jul. 25, 2013, which claims priority from Japanese Patent Application No. 2012-176236 filed Aug. 8, 2012, the contents of which are all herein incorporated by reference in their entirety.

BACKGROUND OF THE INVENTION

Field of the Invention

The present invention relates to a liquid crystal display device including ultra-thin glass and a method for manufacturing the liquid crystal display device.

Description of the Background Art

In recent years, there has been proposed a liquid crystal display for use in a curved form (curved display) or a liquid crystal display device capable of displaying a dual screen (dual-screen display) in which a parallax barrier is arranged on a display surface of a liquid crystal panel. In these liquid crystal displays, ultra-thin glass is commonly used. For example, Japanese Patent Application Laid-Open No. 2003-337550 mentions a liquid crystal panel including, as ultra-thin glass, a glass substrate having an ultra-thin thickness of about 0.01 to 0.15 mm, in order to achieve a flexibly bendable liquid crystal panel that can be also used in a curved display. Japanese Patent Application Laid-Open No. 2011-128547 discloses: a liquid crystal display device capable of the dual-screen display in which, as ultra-thin glass, a glass substrate having an ultra-thin thickness of about 0.1 mm or 0.3 mm is provided only at one substrate side of the liquid crystal display device; and a method for manufacturing the liquid crystal display device. In a liquid crystal display device adapted for the dual-screen display or curved display, ultra-thin glass having a substrate thickness of about 0.1 mm is used. In a process for manufacturing such a liquid crystal display device, after at least one of two glass substrates is thinned, forming a cell substrate by bonding the two substrate with a seal is difficult for strength reasons. Accordingly, as described in the above-mentioned Patent Documents, after two substrates are bonded to each other with a seal to form a cell substrate, a step is performed in which at least one of the substrates is thinned by means of polishing or etching to achieve ultra-thin glass.

Firstly, in a method for manufacturing the liquid crystal panel for the curved display disclosed in Japanese Patent Application Laid-Open No. 2003-337550, a thinning step for thinning a cell substrate in which a liquid crystal is encapsulated is performed after the cell substrate is obtained by performing a sealing step of sealing the liquid crystal by means of a seal surrounding the liquid crystal and two glass substrates, that is, by performing a so-called one drop filling method. In a case of adopting the one drop filling method to encapsulate the liquid crystal, designing of a light-shielding layer and wirings involves a restriction necessary for irradiating the seal with light so that the seal is promptly cured, in order to prevent contamination of the liquid crystal which may be caused by a contact of an uncured seal with the liquid crystal. The restriction particularly leads to thinning of the light-shielding layer and wirings. Thus, in a liquid crystal panel for the curved display, a larger stress is applied to the light-shielding layer and wirings than usual. Therefore, there is a fear that cracking may occur in the light-shielding layer or breaking may occur in the wirings. Such a problem can be avoided by adopting, as a method for encapsulating the liquid crystal, the vacuum injection method instead of the one drop filling method. That is, in a state of a cell substrate in which mother substrates are bonded to each other by a seal, one glass substrate is thinned to achieve ultra-thin glass, then the substrates are cut into a size corresponding to an individual liquid crystal panel, and then a liquid crystal is injected and sealed in a vacuum state.

On the other hand, in a method for manufacturing the liquid crystal panel for the dual-screen display, a step of forming a parallax barrier on a surface of the ultra-thin glass obtained as a result of the thinning is further performed. In this parallax barrier formation step, a light-shielding metal film is formed by means of sputtering or the like, and therefore the substrate is heated so that the substrate temperature rises to a temperature that gives not a little influence on an organic material. Thus, in a case of performing the step of forming a parallax barrier on the cell substrate in which the liquid crystal has been encapsulated by the one drop filling method as shown in the method disclosed in Japanese Patent Application Laid-Open No. 2003-337550, the liquid crystal that is an organic material causes a quality alteration. Accordingly, in the method for manufacturing the liquid crystal panel for the dual-screen display disclosed in Japanese Patent Application Laid-Open No. 2011-128547, such a problem is avoided by adopting the vacuum injection method as the method for encapsulating the liquid crystal. That is, in a state of the cell substrate in which mother substrates are bonded to each other with a seal and no liquid crystal is encapsulated, one glass substrate is thinned to achieve ultra-thin glass, then a parallax barrier is formed, then the substrates are cut into a size corresponding to an individual liquid crystal panel, and then a liquid crystal is injected and sealed in a vacuum state.

As described above, some of problems occurring in the display device including ultra-thin glass, such as the curved display or the dual-screen display, can be avoided by adopting a manufacturing process in which the step of thinning a glass substrate to achieve ultra-thin glass, the step of cutting into a size corresponding to an individual liquid crystal panel, and the step of injecting and sealing a liquid crystal in a vacuum state, which is a liquid crystal injection method using a so-called vacuum injection method, are sequentially performed. However, even in a case of using this method, the following problems remain unsolved.

Firstly, a first problem will be described. When vacuuming of the interior of a cell and a liquid crystal injection step of injecting a liquid crystal from a liquid crystal injection port are performed under a state where one of substrates is ultra-thin glass, a gap between the substrates is properly held by balancing among the pressure of the liquid crystal drawn into the cell, the atmospheric pressure in the outside of the cell at a time of exposure to the atmosphere, the repulsive force exerted by spacers that keep the gap between the two substrates, and the tensile force of the substrates between the spacers that are dispersedly arranged in a plane. However, since the substrate made of the ultra-thin glass has a weak tensile force, a portion thereof located between the spacers and not held by the spacers is overwhelmed by pressing from the atmospheric pressure. Therefore, at a location corresponding to this portion, the gap between the substrates is narrower than the predetermined inter-substrate gap, and depending on conditions, the gap completely disappears.

Additionally, at a location where the liquid crystal has been drawn, the pressure of the liquid crystal acts as a resistive force (reactive force) against the pressing from the atmospheric pressure, thereby preventing the disappearance of the gap.

In performing the liquid crystal injection step of injecting a liquid crystal from the liquid crystal injection port, encapsulation of the liquid crystal starts from a portion near the injection port, and the interior of the cell is sequentially filled with the liquid crystal, until a portion thereof farthest from the injection port (and more specifically, corner portions thereof located at both ends of the side opposed to the side where the injection port is provided) is filled. Accordingly, in these corner portions located on the side opposed to the side where the injection port is provided, which are finally filled with the liquid crystal, the inter-substrate gap is narrowed by the pressing from the atmospheric pressure before these corner portions are filled with the liquid crystal. This narrowing delays completion of the encapsulation of the liquid crystal. If the pressure in the outside of the cell gradually rises and completely returns to the atmospheric pressure under a state where the completion of the encapsulation of the liquid crystal is delayed, a portion of the spacer located at a corresponding position may be deformed beyond an assumed amount of deformation. As a result, the deformation exceeds a range of elastic deformation which is a reversible change, and causes plastic deformation, or even worse, the spacer is fully destroyed. Once a reversible change range is exceeded like this, it is no longer possible to keep a proper gap between the substrates even when the liquid crystal is put therein with a delay. Additionally, in the portion of the spacer that has been fully destroyed, a pillar that supports the cell is lost. Therefore, in any case, unevenness of the gap occurs. Moreover, when the fully destroyed spacer is dispersed to reach a display region within the cell, a display failure due to an abnormal alignment occurs. Furthermore, there is a fear that a constituent element of the spacer of the destroyed spacer may, as an impurity, run into the liquid crystal and contaminate the liquid crystal, which results in a deterioration in the reliability.

Then, a second problem will be described. In a case of the dual-screen display, a parallax barrier formation step, and particularly, a light-shielding layer formation step in which the substrates are heated, is additionally performed before the liquid crystal injection step shown in the above-described the first problem is performed. When the substrates are heated, adoption of the vacuum injection method avoids heating the liquid crystal, but resins of columnar spacers and an alignment film that are arranged within the cell are exposed to the heat treatment. Since the resins of the columnar spacers and the alignment film are also made of an organic material, not a little alteration is caused in the quality of the material. To be specific, examples of a caused change include an increase in the amount of gas emission and a reduction in the range of elastic deformation of the columnar spacers. If the vacuum injection step of injecting the liquid crystal is performed under a state where such a change is caused, depending on an increase in the amount of gas emission, a gas coming from a surface of the substrate accumulates within the cell, which makes it difficult to achieve a normal liquid crystal injection even though normal vacuuming is performed. As a result, more time is taken to complete the encapsulation of the liquid crystal in the above-mentioned corner portions located farther from the injection port. Moreover, since the range of elastic deformation of the columnar spacers is narrowed, it is likely to cause plastic deformation and destruction, which are unrecoverable deformation. Furthermore, these plastic deformation and destruction are likely to occur also in pressure application that is performed in order to push out an extra liquid crystal as a time of sealing the injection port. That is, occurrence of the above-described first problem becomes more conspicuous.

As thus far described, in the liquid crystal display device including ultra-thin glass, such as the curved display or the dual-screen display, some of problems can be avoided by adopting a liquid crystal injection method using a so-called vacuum injection method. On the other hand, as described above, unevenness of the gap and a display failure due to an abnormal alignment occur in the corner portions that are farthest from the injection port. Thus, in the conventional display device including ultra-thin glass, such as the curved display or the dual-screen display, and in the manufacturing of the conventional display device, an ideal structure and an ideal manufacturing method that do not cause the above-described problems have not been proposed yet.

SUMMARY OF THE INVENTION

An object of the present invention is to provide a liquid crystal display device including ultra-thin glass, that puts no restriction on designing of a light-shielding layer, that can prevent occurrence of unevenness of a gap and occurrence of a display failure caused by an abnormal alignment, and that can be manufactured at a low cost and with a good yield of production.

In the present invention, a liquid crystal display device includes: a pair of glass substrates, one of the substrates being an ultra-thin glass substrate; a liquid crystal material interposed between the pair of glass substrates; and a seal pattern for bonding the pair of glass substrates to each other, the seal pattern having an injection port through which the liquid crystal material is injected. Spacer structures are arranged such that the area density of the spacer structures is higher in a corner portion located at a side opposed to a side where the injection port is provided than in a corner portion located at the side where the injection port is provided.

The liquid crystal display device according to the present invention is a liquid crystal display device including ultra-thin glass that can prevent plastic deformation and destruction of spacers or damage to spacers, which occurs in a corner portion farther from an injection port in a case where the liquid crystal display device is manufactured by a liquid crystal injection method using a vacuum injection method.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a cross-sectional view of the liquid crystal panel of the liquid crystal display device according to the preferred embodiment 1 of the present invention;

DESCRIPTION OF THE PREFERRED EMBODIMENTS

Preferred Embodiment 1.

Figure 1:
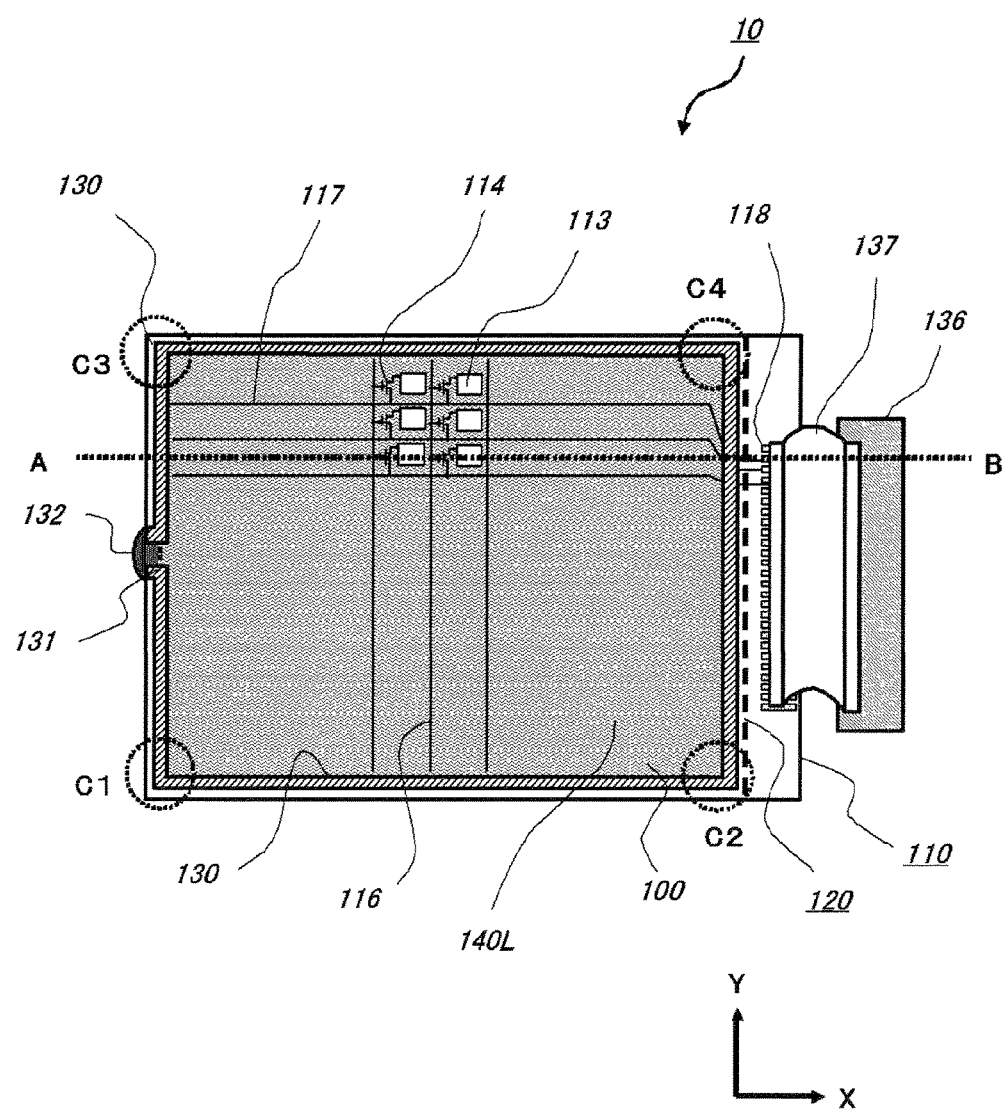
FIG. 1 is a plan view of a liquid crystal panel of a liquid crystal display device according to a preferred embodiment 1 of the present invention.
Figure 3:
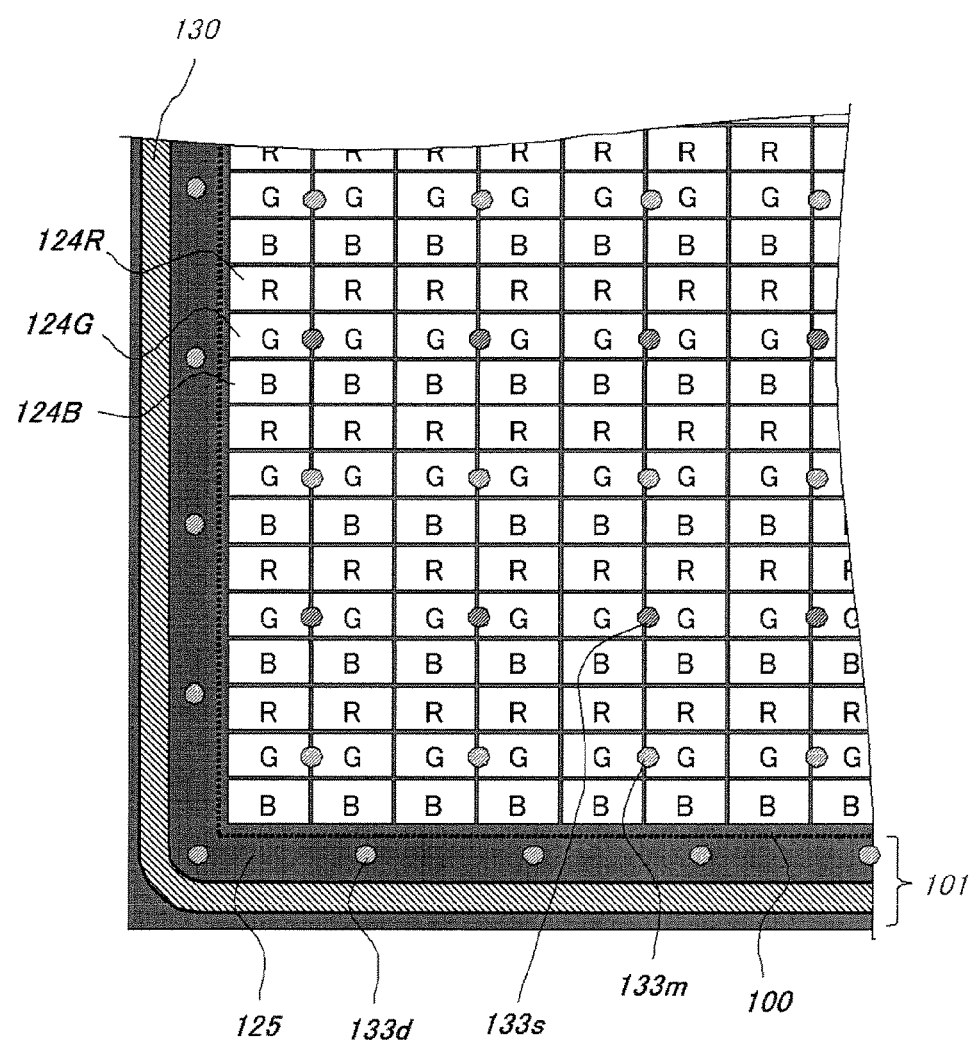
FIG. 3 is a plan view showing an area near a corner portion of a CF substrate of the liquid crystal panel according to the preferred embodiment 1 of the present invention.
Figure 4:
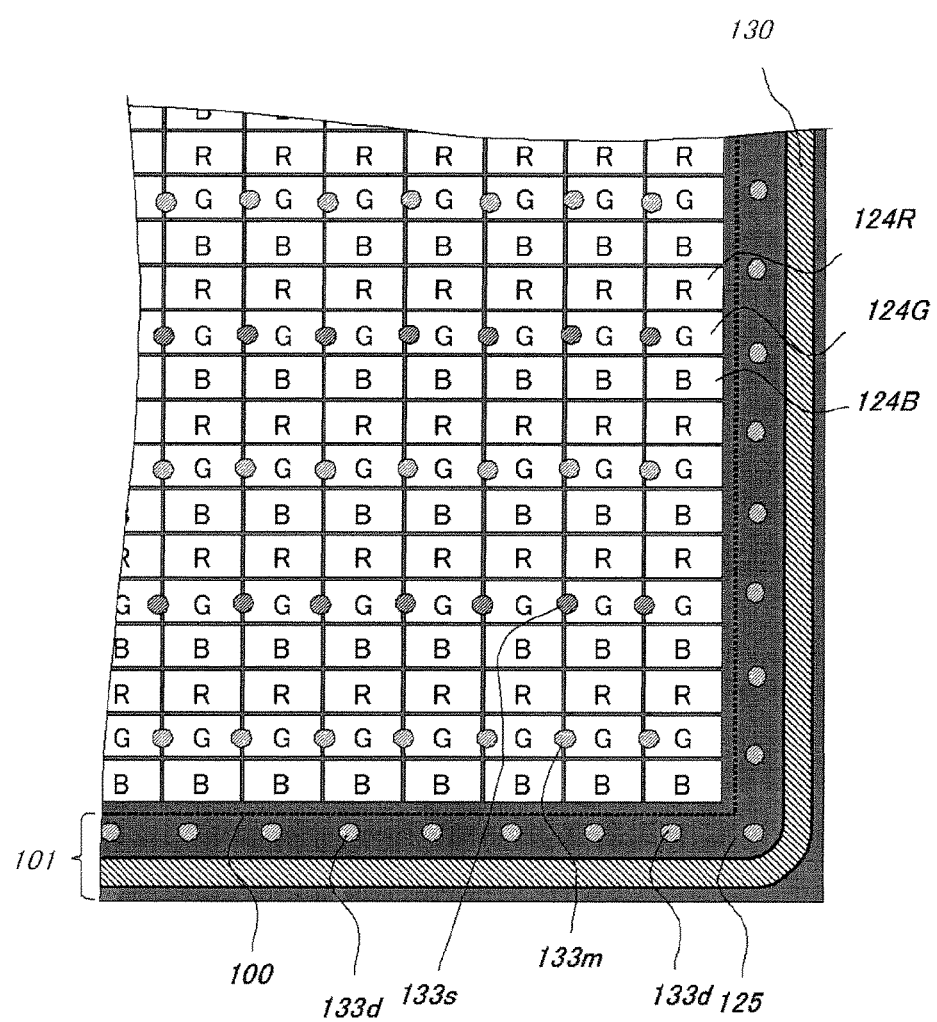
FIG. 4 is a plan view showing an area near a corner portion of the CF substrate of the liquid crystal panel according to the preferred embodiment 1 of the present invention.

A configuration of a liquid crystal panel 10 used in a liquid crystal display device according to a preferred embodiment 1 will be described with reference to schematic diagrams of FIGS. 1, 2, 3, and 4. FIG. 1 is a plan view showing a configuration of the whole of a liquid crystal panel. FIG. 2 is a cross-sectional view as taken along the line A-B of FIG. 1. FIGS. 3 and 4 are plan views showing principal area in corner portions C1 and C2 shown in FIG. 1. These drawings are merely schematic, and do not exactly reflect the sizes of component parts, and the like, that are shown therein. To avoid complicating the drawings, as appropriate, parts other than principal parts of the invention are omitted and configurations are partially simplified. The same is true for the subsequent drawings. Moreover, in the subsequent drawings, the same component parts as those illustrated in the already-described drawings are denoted by the same reference numerals, and descriptions thereof will be appropriately omitted.

Here, as an example, a TFT (Thin Film Transistor) type dual-screen display liquid crystal panel will be described. This liquid crystal panel 10, as shown in the drawing, includes a switching element substrate (hereinafter, TFT substrate 110) on which TFTs are arranged in an array as switching elements, a color filter substrate (hereinafter, CF substrate 120) on which color filters and the like are formed, and a seal pattern 130 that seals a gap between the CF substrate 120 and the TFT substrate 110. The seal pattern 130 is provided in a frame region 101 that is arranged so as to surround at least a display region 100 that is a region corresponding to a display surface that displays an image when the liquid crystal panel 10 operates.

Additionally, between the TFT substrate 110 and the CF substrate 120, a number of columnar spacers 133 are arranged in the display region 100. The columnar spacers 133 form and keep the gap within a predetermined range, in other words, between the substrates. In other words, the columnar spacers 133 keep a distance between the substrates within a certain range. In the display region 100, two kinds of columnar spacers 133, namely, main columnar spacers (hereinafter, columnar spacers (main)) 133m and sub columnar spacers (hereinafter, columnar spacers (sub)) 133s, are provided. In a normal state, the columnar spacers (main) 133m keep the TFT substrate 110 and the CF substrate 120 spaced apart with a predetermined gap within a certain range. The columnar spacers (sub) 133s are formed with a height lower than the columnar spacers (main) 133m. In a case where the space between the TFT substrate 110 and the CF substrate 120 is narrowed as compared with in the normal state, for example, in a case where a surface of the TFT substrate 110 or a surface of the CF substrate 120 is pressed, the columnar spacers (sub) 133s come into contact with the surface of the TFT substrate 110 or the surface of the CF substrate 120, and thereby cooperate with the columnar spacers (main) 133m to keep the space between the TFT substrate 110 and the CF substrate 120 within a certain range.

The columnar spacers 133, which keep the distance between the substrates within a certain range, are provided in the frame region 101, too. These columnar spacers 133 will be called peripheral columnar spacers (hereinafter, columnar spacers (peripheral)) 133d. It may be possible that the columnar spacers (peripheral) 133d have the same height as the height of the columnar spacers (main) 133m and configured to, in the normal state, keep the TFT substrate 110 and the CF substrate 120 spaced apart with a predetermined gap within a certain range. However, herein, similarly to the columnar spacers (sub) 133s, the columnar spacers (peripheral) 133d are formed with a height lower than the columnar spacers (main) 133m and configured to keep the space between the TFT substrate 110 and the CF substrate 120 only when the surface of the TFT substrate 110 or the surface of the CF substrate 120 is pressed. An arrangement of each kind of the columnar spacers 133 is a main point of the present invention. Therefore, detailed description thereof will be separately given later.

A liquid crystal material is interposed in a part of the gap, corresponding to at least the display region 100, between the CF substrate 120 and the TFT substrate 110 that are sealed by the seal pattern 130 and kept by the columnar spacers 133. Thus, a liquid crystal layer 140L is arranged. The seal pattern 130 has an injection port 131 that is an opening for injecting the liquid crystal material. The injection port 131 is sealed with a sealant 132. In other words, the liquid crystal material is sealed in a region surrounded by the seal pattern 130. Herein, a liquid crystal material of TN (Twisted Nematic) type, which is a common liquid crystal material, is adopted as the liquid crystal material. It should be noted that the display region 100 and the frame region 101 herein are used to indicate all of regions on the TFT substrate 110 and the CF substrate 120 of the liquid crystal panel 10, and a region sandwiched between the substrates. The same applies to the following description of this specification.

The above-described TFT substrate 110 includes an alignment film 112, pixel electrodes 113, TFTs 114, an insulating film 115, a plurality of gate wirings 116 and source wirings 117, a transfer electrode (not shown), and the like. The alignment film 112 aligns liquid crystals on one surface of a glass substrate 111 that is a transparent substrate made of typical glass with a thickness of about 0.7 mm The pixel electrodes 113 are provided below the alignment film 112, and apply a voltage for driving the liquid crystals. The TFTs 114 are switching elements that supply a voltage to the pixel electrodes 113. The insulating film 115 covers the TFTs 114. The plurality of gate wirings 116 and source wirings 117 are wirings that supply signals to the TFTs 114. The signal terminal 118 receives, from the outside, the signals that are supplied to the TFTs 114. The transfer electrode transfers the signals inputted from the signal terminal 118 to a counter electrode 123. Furthermore, on the other surface of the glass substrate 111, a polarizing plate 134 is provided.

On the other hand, the above-described CF substrate 120 includes an alignment film 122, a common electrode 123, a black matrix (BM) 125, and the like. The alignment film 122 aligns liquid crystals on one surface of a glass substrate 121 that is a transparent substrate made of ultra-thin glass with a thickness of about 0.1 mm The common electrode 123 is provided below the alignment film 122. The common electrode 123 generates an electric field between the common electrode 123 and the pixel electrodes 113 on the TFT substrate 110, to drive the liquid crystals. The BM 125 is a light-shielding layer for shielding light between the color filters 124 provided below the common electrode 123 or for shielding light to the frame region arranged outside the region corresponding to the display region 100. Furthermore, on the other surface of the glass substrate 121, a parallax barrier 126 is arranged as a dual-screen display. The parallax barrier 126 is a light-shielding layer that separates the viewing direction into two directions. In the parallax barrier 126, slit-shaped openings are formed at positions shifted from openings of the BM 125, each of which is arranged in the pixel, so that the viewing direction is separated and restricted. Additionally, a polarizing plate 135 is provided at the outer side of the parallax barrier 126.

As the color filters 124, color material layers having a pigment or the like dispersed in a resin may be selected. The color filter 124 functions as a filter that selectively allows light in a specified wavelength range, such as red, green, and blue, to transmit therethrough. The color material layers having such different colors are regularly arranged to thereby constitute the color filters 124 (in FIGS. 3 and 4 showing details, color filters 124R, 124G, and 124B are illustrated). The BM 125 is arranged not only between the color filters 124, but also in the frame region outside the display region 100. The BM 125 is formed over almost the entire region of the frame region in the CF substrate 120. Thus, the BM 125 shields light against transmission through the CF substrate 120 in the frame region in which display is unnecessary. As the light-shielding layers that form the BM 125 and the parallax barrier 126, a metal-based material including a laminated film of chrome and chrome oxide or a resin-based material having black particles dispersed in a resin may be selected. On the other hand, below the alignment film, an overcoat layer including a transparent resin film may be provided to cover the color filters 124 and the BM 125.

The TFT substrate 110 and the CF substrate 120 are bonded to each other with the seal pattern 130 interposed therebetween, and are kept spaced apart from each other with a predetermined substrate interval by the columnar spacers 133 arranged on the display region 100. Moreover, the transfer electrode and the common electrode 123 are electrically connected to each other by a transfer material. A signal inputted from the signal terminal 118 is transferred to the common electrode 123. Instead of providing the transfer material, conductive particles or the like may be mixed in the seal pattern 130. Alternatively, the transfer material may be omitted. In this preferred embodiment, the seal pattern 130 in which conductive particles are mixed is used. As seen from FIG. 2, the seal pattern 130 and the common electrode 123 are in contact with each other. Therefore, the transfer electrode is arranged so as to overlap the seal pattern 130 in a plan view and so as to in contact with the seal pattern 130. Thereby, the transfer electrode and the common electrode 123 are electrically connected through the seal pattern 130.

In addition, the liquid crystal panel 10 includes a control board 136, an FFC (Flexible Flat Cable) 137, a backlight unit, and the like. The control board 136 generates a drive signal. The FFC 137 electrically connects the control board 136 to the signal terminal 118. The backlight unit serves as a light source (which is typically arranged so as to face the outside of the TFT substrate 110 that is the side opposite to the side where the CF substrate 120 is arranged to provide the display surface, but is not shown herein). The liquid crystal panel 10, as well as the above-mentioned members, is accommodated in a housing (not shown) that is opened in its portion corresponding to an outer portion of the CF substrate 120 in the display region 100 serving as the display surface. Thus, the liquid crystal display device according to the preferred embodiment 1 is formed.

Next, a supplementary description will be given to a configuration of the columnar spacers 133 that keep the distance between the substrates within a certain range, which is a characteristic point of the liquid crystal panel 10 according to the preferred embodiment 1. Additionally, a supplementary description will be given also to corner portions including the columnar spacers 133, which are regions peripheral to the panel. In the liquid crystal panel 10 according to the preferred embodiment 1, in corner portions C1 to C4 shown in FIG. 1, the corner portions C1 and C3 located at both end on the side of the liquid crystal panel 10 or the CF substrate 120 where the injection port 131 is provided are different in the configuration from corner portions C2 and C4 located at both ends on the side opposed to the side where the injection port 131 is provided. Therefore, the corner portion C2 and the corner portion C2, in which the configurations of the columnar spacers 133 are different from each other, are taken as an example, and a description including comparison will be given with reference to the plan views of FIGS. 3 and 4. FIG. 3 is a plan view showing the corner portion C1. FIG. 4 is a plan view showing the corner portion C2.

Firstly, a configuration of the columnar spacer 133 in the corner portion C1 will be described with reference to FIG. 3. As shown in FIG. 3, in the corner portion C1 located at one end on the side of the liquid crystal panel 10 or the CF substrate 120 where the injection port 131 is provided, the columnar spacers (main) 133*m* and the columnar spacers (sub) 133*s* formed with a height lower than the columnar spacers (main) 133*m* are provided in the display region 100, as described above. More specifically, among positions each located between the green pixels (124G), positions where the columnar spacer (main) 133*m* and the columnar spacer (sub) 133*s* are arranged and positions where they are not arranged are alternately repeated. Moreover, among columns of green pixels arranged in a row direction, a column of green pixels where the columnar spacers (main) 133*m* are arranged and a column of green pixels where the columnar spacers (sub) 133*s* are arranged are alternately repeated. That is, the density of arrangement of the columnar spacers (main) 133*m* is equal to the density of arrangement of the columnar spacers (sub) 133*s*. The columnar spacers (main) 133*m* are provided at a rate of one per twelve pixels.

Similarly, the columnar spacers (sub) 133s are provided at a rate of one per twelve pixels.

As for the degree to which the height of the columnar spacers (sub) 133s is lower than the height of the columnar spacers (main) 133m, the columnar spacers (sub) 133s is set lower than the columnar spacers (main) 133m by about 15% of the height of the columnar spacers (main) 133m. That is, the height of the columnar spacers (sub) 133s is set to be about 85% of the height of the columnar spacers (main) 133m.

This rate of arrangement of the columnar spacers (main) 133m and the columnar spacers (sub) 133s is common to areas near the corner portion C1 and the corner portion C3 that is, similarly to the corner portion C1, located at the other end on the side opposite to the side where the injection port 131 is provided. It may be acceptable that this rate of arrangement of the columnar spacers (main) 133m and the columnar spacers (sub) 133s is common to the inside of the display region 100 except for areas near the corner portions C2 and C4 that are located at both ends on the side opposed to the side where the injection port 131 is provided.

Next, a configuration of the columnar spacers 133 in the corner portion C2, in which the arrangement is different from that in the corner portion C1, will be described with reference to FIG. 4. As seen from FIG. 4 that is a plan view showing the corner portion C2, the density of arrangement of the columnar spacers 133 in the area near corner portion C2 is higher than the density of arrangement of the columnar spacers 133 in the area near the corner portion C1. More specifically, unlike the arrangement shown in FIG. 3, the columnar spacers (main) 133m and the columnar spacers (sub) 133s are arranged in all the positions, not alternate positions, among positions each located between the green pixels (124G). That is, either of the columnar spacers (main) 133m and the columnar spacers (sub) 133s is arranged at every position between the green pixels (124G). Among columns of green pixels arranged in a row direction, a column of green pixels where the columnar spacers (main) 133m are arranged and a column of green pixels where the columnar spacers (sub) 133s are arranged are alternately repeated. This point is identical to the arrangement shown in FIG. 3. Therefore, the density of arrangement of the columnar spacers (main) 133m is equal to the density of arrangement of the columnar spacers (sub) 133s. As for the density of arrangement, the columnar spacers (main) 133m are provided at a rate of one per six pixels. Similarly, the columnar spacers (sub) 133s are provided at a rate of one per six pixels. Thus, the density of arrangement is twice higher than the density of arrangement shown in FIG. 3.

As for the columnar spacers (peripheral) 133d provided in the frame region 101, too, the density of arrangement in the corner portion C2 shown in FIG. 4 is, as illustrated in the drawing, almost twice higher than the density of arrangement in the corner portion C1 shown in FIG. 3. In an example shown in FIGS. 3 and 4, the columnar spacers (peripheral) 133d are arranged in one line in the frame region 101. This is the simplest example, which is adopted for avoiding complicating the drawing. As appropriate, the columnar spacers (peripheral) 133d may be arranged in a plurality of lines in accordance with the width of the frame region 101. It is not always necessary that the columnar spacers (peripheral) 133d are aligned. Instead, the columnar spacers (peripheral) 133d may be dispersedly arranged at a constant density. Even in a case where, in this manner, a plurality of columnar spacers (peripheral) 133d are provided in the frame region 101 or the columnar spacers (peripheral) 133d are dispersedly arranged at a constant density, it suffices that the density of arrangement in the corner portion C2 is higher than the density of arrangement in the corner portion C1.

The liquid crystal display device and the liquid crystal panel 10 according to the preferred embodiment 1, whose configuration has been described above, operates as follows. For example, when an electrical signal is inputted from the control board 136, a drive voltage is applied to the pixel electrode 113 and the common electrode 123, so that the direction of liquid crystal molecules in the liquid crystal layer 140L is changed according to the drive voltage. Light emitted from the backlight unit is transmitted to an observer side or blocked through the TFT substrate 110, the liquid crystal layer 140L, and the CF substrate 120. Thereby, a video image or the like is displayed on the display region 100 of the liquid crystal panel 10.

Since the liquid crystal display device according to the preferred embodiment 1 is a dual-screen display liquid crystal panel, the light that is transmitted through the CF substrate 120 is restricted to a viewing angle range in two predetermined angle directions by the parallax barrier 126. To be specific, the video image or the like is displayed on the display surface with a viewing angle range in two directions of +X direction and −X direction in the drawing. Moreover, display pixels that correspond to the viewing angle range in two directions are set, thus displaying different video images, respectively. Thereby, the liquid crystal display device functions as a dual-screen display liquid crystal panel that displays different video images in the viewing angle range in two directions. As described above, the liquid crystal display device according to the preferred embodiment 1 has a characteristic configuration in the configuration of the columnar spacers 133 in corner portions. Accordingly, even though the liquid crystal display device according to the preferred embodiment 1 is a dual-screen display liquid crystal panel including ultra-thin glass in which unevenness of a gap and a display failure due to an abnormal alignment are conventionally likely to occur, it is possible to obtain a dual-screen display liquid crystal panel with a high display quality in which unevenness of a gap and a display failure due to an abnormal alignment are not observed.

Figure 5:
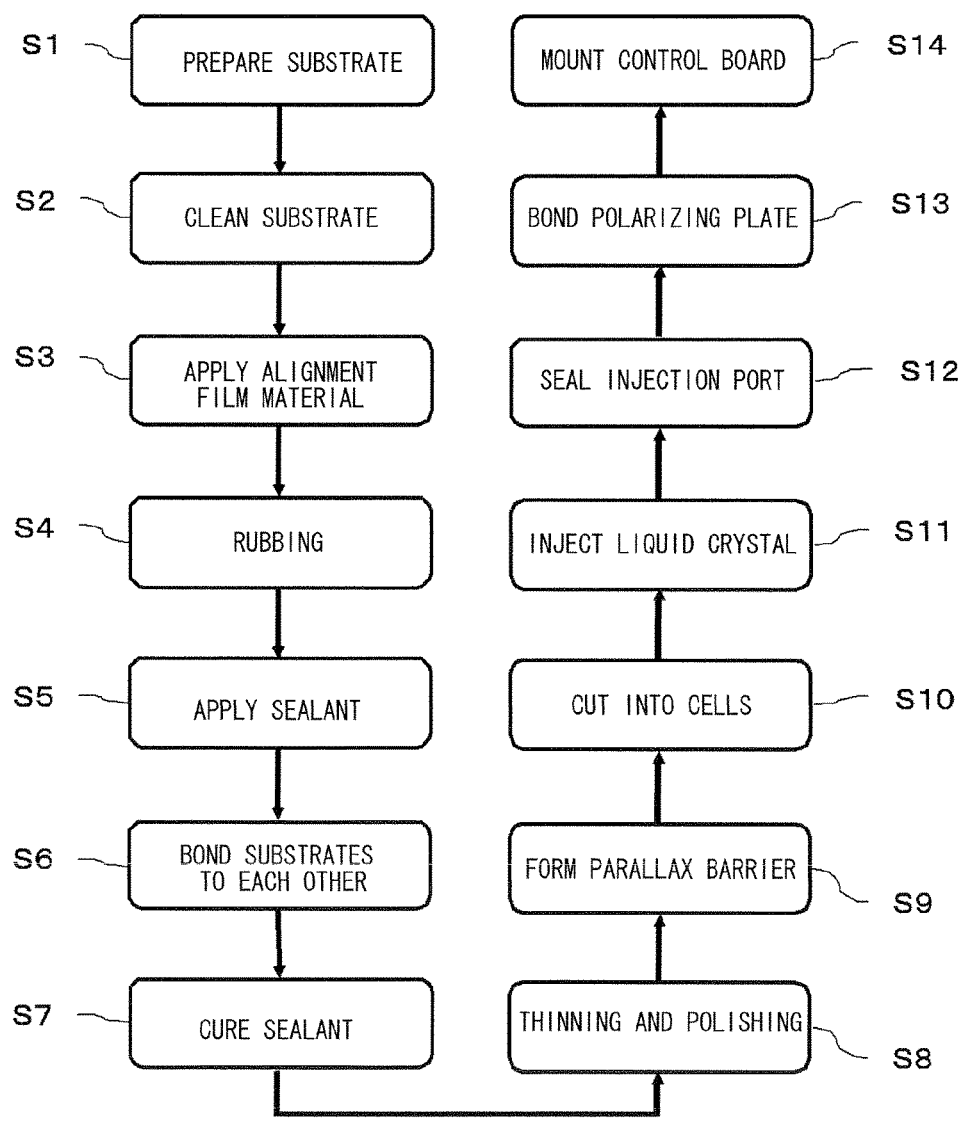
FIG. 5 is a flowchart showing an assembling process in a method for manufacturing the liquid crystal panel according to the preferred embodiment 1 of the present invention.

Next, a method for manufacturing the liquid crystal display device and the liquid crystal panel 10 according to the preferred embodiment 1 will be described. Firstly, the outline of a process for assembling the liquid crystal panel 10 according to the preferred embodiment 1 will be described in accordance with the flowchart shown in FIG. 5.

Firstly, in a substrate preparation step, a mother TFT substrate and a mother CF substrate, from which the TFT substrate 110 and the CF substrate 120 are cut out before being bonded to each other, are prepared (S1). As for the mother TFT substrate 10 and the mother CF substrate 20, the CF substrate 120 is finally subjected to a glass thinning process so that ultra-thin glass is achieved. However, for facilitating the subsequent steps, until a certain point in the middle of the process, the TFT substrate 110 and the CF substrate 120 are manufactured from the mother TFT substrate and the mother CF substrate that are made of glass with a thickness of about 0.5 to 1.5 mm Here, both the mother TFT substrate and the mother CF substrate 20 are prepared as substrates made of glass with a thickness of 0.7 mm An ordinary method is adoptable as the method for manufacturing the mother TFT substrate and the mother CF substrate, and therefore a description thereof will be briefly given. The mother TFT substrate is manufactured by, through a known manufacturing method, repeatedly performing a film formation and a pattern formation such as patterning or etching using the photolithography technique, so that the TFTs 114, the pixel electrodes 113, a wiring layer including the gate wirings 116 and the source wirings 117, the terminal 118, and the transfer electrode are formed on one surface of the glass substrate 111. The mother CF substrate is manufactured by, similarly through a known manufacturing method, repeatedly performing a film formation to a pattern formation, so that the color filters 124, the black matrix 125, the common electrode 123, and the columnar spacers 133 obtained by patterning an organic resin film, are formed on one surface of the glass substrate 121. As for the columnar spacer 133 that is a characteristic configuration of the present invention, too, only a change in pattern designing, such as the density of arrangement, is necessary, and a known method is adoptable as a method for manufacturing the columnar spacer 133 itself.

Then, in a substrate cleaning step, the mother TFT substrate prepared in the above-described manner is cleaned (S2). Then, in an alignment film material application step, an alignment film material is applied to one surface of the mother TFT substrate (S3). This step is achieved by, for example, applying an alignment film material made of an organic film by means of printing process and drying the alignment film material by baking it with a hot plate or the like. Then, in a rubbing step, the alignment film material is rubbed, and a surface of the alignment film material is subjected to an alignment process, thus obtaining the alignment film 112 (S4).

As for the mother CF substrate, too, the alignment film 122 is formed by performing the cleaning, applying an alignment film material, and performing the rubbing, similarly to steps S2 to S4. Then, in a sealant application step, a sealant serving as a printing paste is applied to one surface of the mother TFT substrate or the mother CF substrate by means of a screen printing apparatus. Finally, the seal pattern 130 having a shape that surrounds the display region 100 is formed (S5).

Then, in a bonding step, the mother TFT substrate and the mother CF substrate are bonded to each other, thus forming a cell substrate (S6). Then, in a sealant curing step, the sealant that forms the seal pattern 130 is completely cured under a state where the mother TFT substrate and the mother CF substrate are bonded to each other (S7).

This step is achieved by, for example, heating the sealant or irradiating the sealant with ultraviolet rays, which depends on a material of the sealant.

Then, in order to enable the liquid crystal panel 10 to be curved or in order to achieve a dual-screen display liquid crystal panel as illustrated in this preferred embodiment, a thinning and polishing step is performed in which the glass substrate of at least one of the mother TFT substrate and the mother CF substrate bonded to each other is thinned into ultra-thin glass (S8). More specifically, a thinning process using a chemical solution or mechanical polishing can be selected. For example, in a case of thinning both the mother TFT substrate and the mother CF substrate by means of a thinning process using a chemical solution, peripheral sealing is applied to peripheral portions of the mother TFT substrate and the mother CF substrate for the prevention of entrance of the chemical solution into a space between the substrates, and then the mother TFT substrate and the mother CF substrate bonded to each other are entirely immersed with the chemical solution, and the surfaces of the mother TFT substrate and the mother CF substrate are scraped and thus thinned In a case of thinning only one of the TFT substrate 10 and the CF substrate 20, for example, in a case of thinning only the CF substrate 20 as illustrated in the preferred embodiment 1, it is preferable that, under a state where not only the peripheral seal but also a protection layer is formed on a surface of the mother TFT substrate by means of a resist, only a surface of the mother CF substrate is scraped and thus thinned.

In addition, a parallax barrier formation step is performed in which the parallax barrier 126 including a light-shielding layer, which functions as a dual-screen display liquid crystal panel, is formed on the surface of the mother CF substrate that is the thinned side (S9). To be specific, in accordance with the material of the parallax barrier 126, a film of a metal-based material including, for example, a laminated film of chrome and chrome oxide is formed, and a patterning process in accordance with the material of the parallax barrier 126 is performed to thereby form a pattern having slit-shaped openings provided in predetermined positions such that the film functions as the parallax barrier 126. The process for forming the film of the metal-based material is achieved by performing sputtering while heating the substrate.

Then, in a cell cutting step, the mother TFT substrate and the mother CF substrate bonded to each other are cut into a large number of individual cells (S10). In this step, the cutting is achieved by, in a scribe step, forming a scribe line that serves as the origin of cutting on the surface of the glass substrate and then applying a stress to the vicinity of the scribe line. Thereby, the cutting is achieved, and a large number of individual cells are obtained.

Then, in a liquid crystal injection step, a liquid crystal is injected from an injection port of the individual cell (S11). This step is performed, for example, as follows. In a vacuum injection apparatus in a vacuum state, the injection port of the individual cell is in contact with the liquid crystal material, and in this condition, the interior of the apparatus is gradually approximated to the atmospheric pressure. This causes the liquid crystal material to be injected into the cell through the injection port, that is, to be loaded in the cell through the injection port. Furthermore, in an injection port sealing step, the injection port is sealed (S12). This step is achieved by, for example, sealing the injection port with a light-curable resin and emitting light thereto. Since the liquid crystal injection step (S11) is an important step for exerting the effects of the present invention, the liquid crystal injection step (S11) will be separately described in detail.

After the substrates are cut into an individual liquid crystal panel and the liquid crystal material is loaded and sealed in the above-described manner, a polarizing plate bonding step is performed in which a polarizing plate 134 and a polarizing plate 135 are bonded to the surfaces of the TFT substrate 110 and the CF substrate 120 located outside the cell substrate (S13). In a control board mounting step, the control board 136 is mounted (S14). Thereby, the liquid crystal panel 10 is completed. Moreover, a backlight unit is provided, with interposition of an optical film such as a wave plate, on the back surface side of the TFT substrate 110 that is the side opposite to the viewing side of the liquid crystal panel 10. The liquid crystal panel 10 and the above-mentioned peripheral members are appropriately accommodated in the frame made of a resin, a metal, or the like. Thus, the liquid crystal display device according to the preferred embodiment 1 is completed.

Figure 6A:
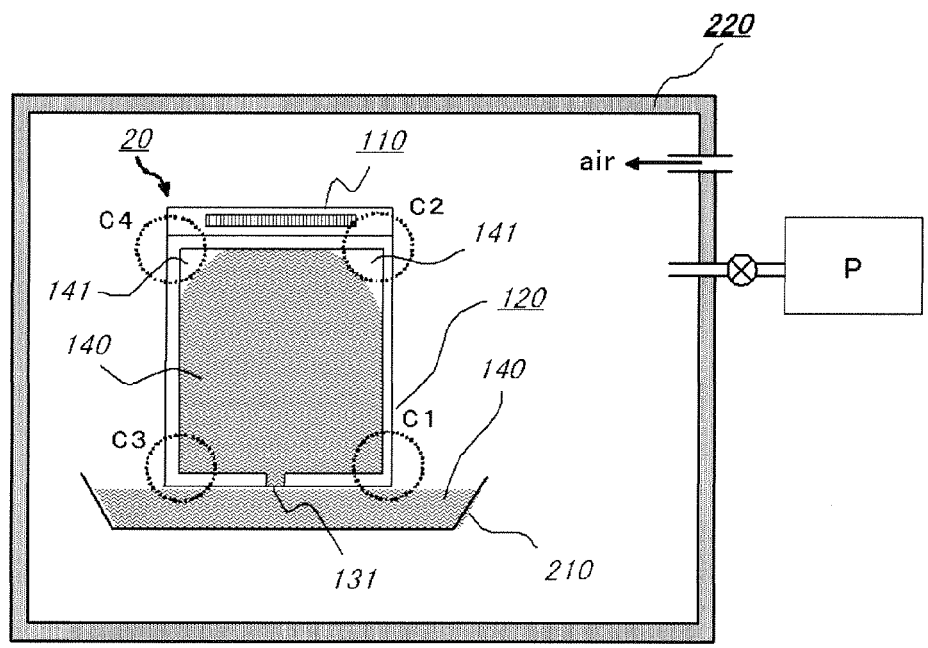
FIGS. 6A and 6B are diagrams for explaining an outline of a vacuum injection step in a process for manufacturing the liquid crystal panel according to the preferred embodiment 1 of the present invention.
Figure 6B:
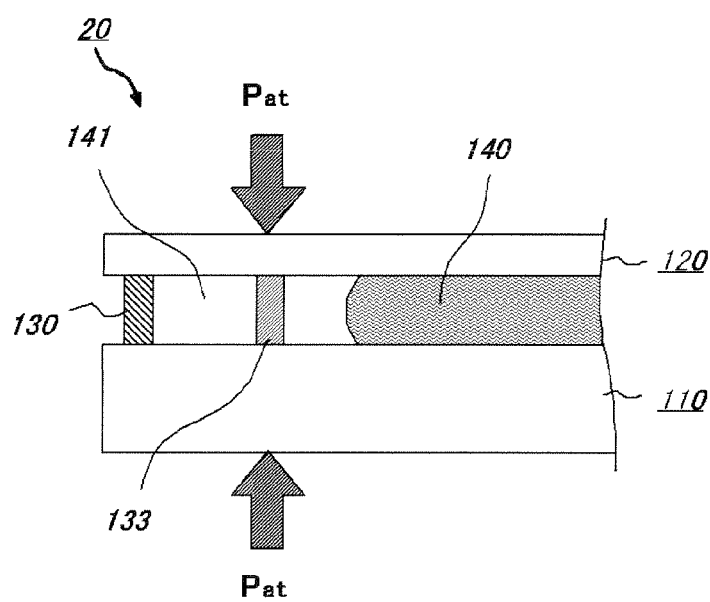

Next, the liquid crystal injection step (S11), which is a characteristic step of the present invention, will be described in detail with reference to the explanatory diagrams of FIGS. 6A to 9C. Firstly, the outline of a phenomenon that occurs when the liquid crystal material 140 is drawn into the individual cell 20 in the liquid crystal injection step (S11) will be described with reference to FIGS. 6A and 6B. FIG. 6A is a diagram showing, in outline, that the liquid crystal material 140 is being drawn into the individual cell 20 in a vacuum injection apparatus 220 in the liquid crystal injection step. FIG. 6B is a cross-sectional view of the individual cell 20, particularly in the corner portions C2 and C4 shown in FIG. 6A. As shown in FIG. 6A, under a state where the individual cell 20 is accommodated in the vacuum injection apparatus 220, a vacuum pump P is operated to bring the vacuum injection apparatus 220 into a vacuum state. In this state, the injection port 131 of the individual cell 20 is brought into contact with the liquid crystal material 140 contained in a liquid crystal tray 210. In this condition, the interior of the vacuum injection apparatus 220 is gradually approximated to the atmospheric pressure. This causes the liquid crystal material 140 to be drawn into the individual cell 20 through the injection port 131. FIG. 6A shows a state in a state slightly before the liquid crystal material 140 is loaded in the entire individual cell 20.

As shown in FIG. 6A, in the areas near the corner portions C2 and C4 that are located at both ends of the side opposed to the side where the injection port 131 is provided, loading of the liquid crystal material 140 has not yet been completed, that is, foams 141 are generated, because these areas correspond to the positions farthest from the injection port 131. In the areas near the corner portions C2 and C4, the interior of the individual cell 20 (in the foams 141) is almost in the vacuum state. On the other hand, the interior of the vacuum injection apparatus 220 almost already returns to the atmospheric pressure. Therefore, as shown in the cross-sectional view of FIG. 6B, a state is created in which a pressure Pat equivalent to the atmospheric pressure is acting, from outside of the cell, onto the surface of the TFT substrate 110 and the surface of the CF substrate 120. To the contrary, the state in the foams 141 is still almost the vacuum state. Accordingly, the pressure Pat directly acts on the columnar spacers 133 that are arranged in the foam 141. Such a situation is not special, and occurs commonly in any liquid crystal panel that is formed through the vacuum injection method.

Figure 7A:
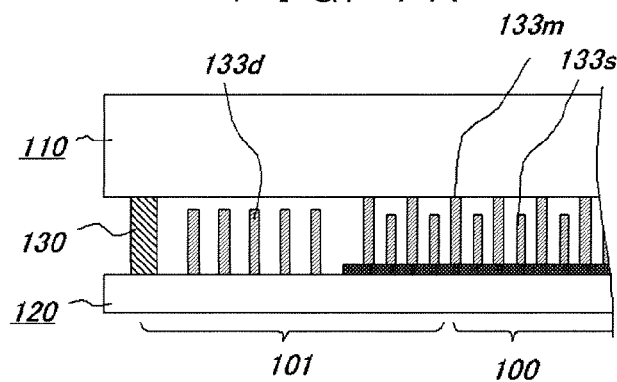
FIGS. 7A to 7C are cross-sectional views showing an area near a corner portion during the vacuum injection step in the process for manufacturing the liquid crystal panel according to the preferred embodiment 1 of the present invention.
Figure 7B:
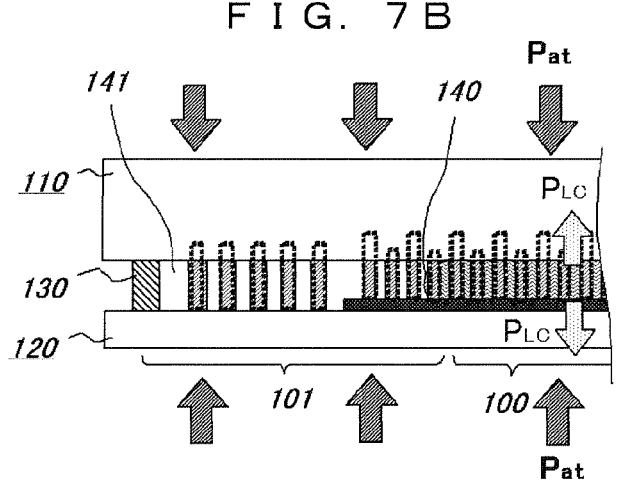
Figure 7C:
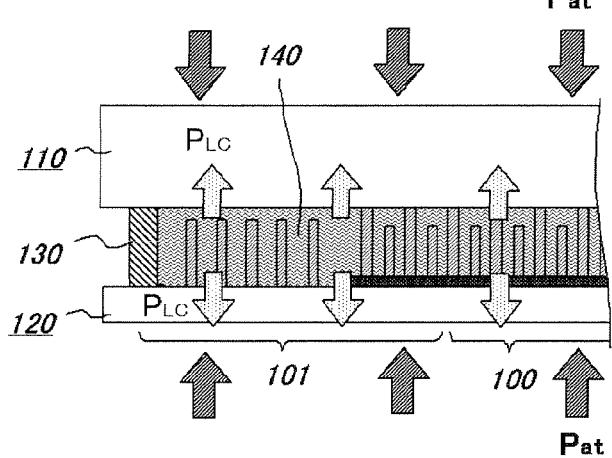
Figure 8A:
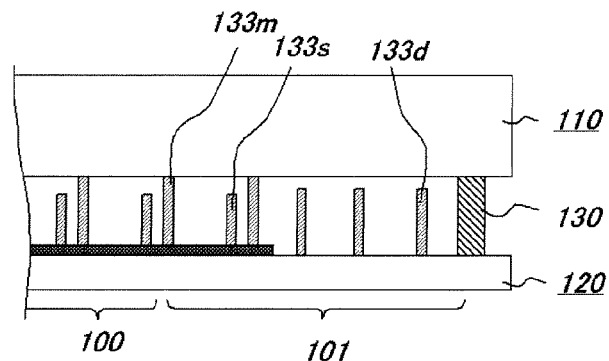
FIGS. 8A to 8C are cross-sectional views showing an area near a corner portion during the vacuum injection step in the process for manufacturing the liquid crystal panel according to the preferred embodiment 1 of the present invention.
Figure 8B:
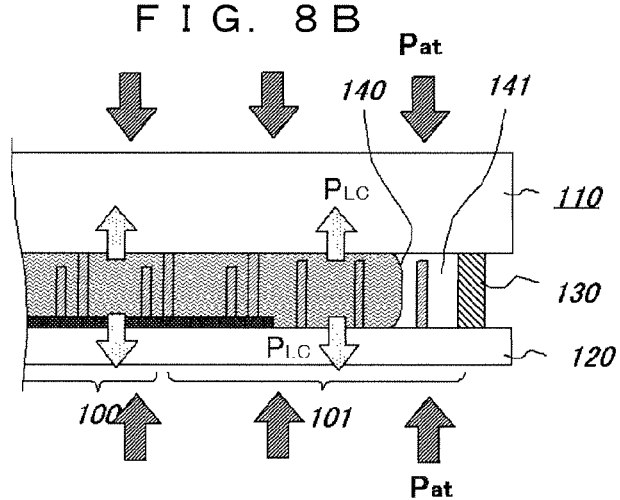
Figure 8C:
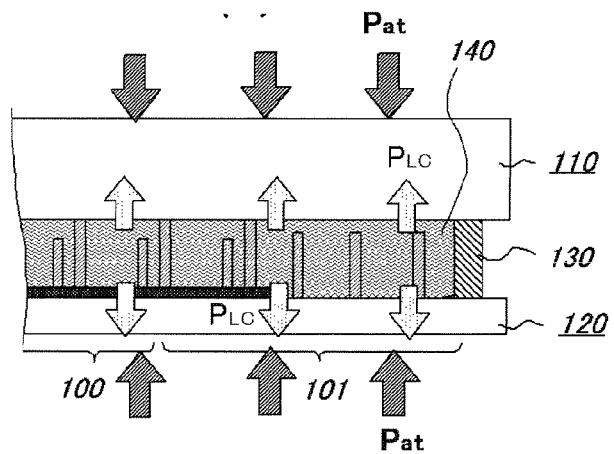

In light of the above-described circumstances, next, a phenomenon and an effect occurring in the liquid crystal injection step (S11) in the liquid crystal display device according to the preferred embodiment 1 will be described with reference to FIGS. 7A to 8C. FIGS. 7A to 7C are cross-sectional views showing the corner portion C2 that is located at one end on the side opposed to the side where the injection port 131 is provided. FIG. 7A shows a state before the liquid crystal injection step (S11) is started. FIG. 7B shows a state slightly before the liquid crystal injection step is completed, almost at the same time point as the time point shown in FIG. 6A described above. FIG. 7C shows a state at a time when the liquid crystal injection step is completed. FIGS. 8A to 8C are cross-sectional views showing the corner portion C1 that is located at one end on the side where the injection port 131 is provided. Similarly to FIGS. 7A to 7C, FIG. 8A shows a state before the liquid crystal injection step (S11) is started, FIG. 8B shows a state slightly before the liquid crystal injection step is completed, almost at the same time point as the time point shown in FIG. 6A described above, and FIG. 8C shows a state at a time when the liquid crystal injection step is completed.

Firstly, regarding the state before the liquid crystal injection step (S11) is started, FIG. 7A showing the corner portion C2 located farther from the injection port 131 and FIG. 8A showing the corner portion C1 located closer to the injection port 131 are compared with each other. In the comparison between FIGS. 7A and 8A as well as the description of FIGS. 3 and 4 given above for describing the configuration of the liquid crystal display device and the liquid crystal panel 10 according to the preferred embodiment 1, the columnar spacers 133 are arranged such that the density of arrangement in the corner portion C2 located farther from the injection port 131 is higher than the density of arrangement in the corner portion C1 located closer to the injection port 131. In this stage, pressure or the like is not applied particularly to a region between the TFT substrate 110 and the CF substrate 120 (and more exactly, between the mother TFT substrate and the mother CF substrate). A space between the TFT substrate 110 and the CF substrate 120 is kept by the columnar spacers (main) 133$m$ being in contact with the TFT substrate 110 and the CF substrate 120.

Then, at a time point slightly before the liquid crystal injection step is completed, in the corner portion C1 located closer to the injection port 131, as shown in FIG. 8B, the liquid crystal material 140 has been loaded to a portion in the vicinity of the seal pattern 130. On the other hand, in the corner portion C2 located farther from the injection port 131, the liquid crystal material 140 is still distant from the seal pattern 130, and merely starting to reach the frame region 101. Since the pressure in the outside of the cell has already returned to pressure around the atmospheric pressure, the pressure Pat that is almost equivalent to the atmospheric pressure is applied to the TFT substrate 110 and the CF substrate 120 from the outside of the cell. Against this atmospheric pressure, pressure PLC of the liquid crystal material 140 and a repulsive force caused by compression of the columnar spacers 133 are exerted as a resistive force (reactive force) from the inside of the cell. The pressure PLC of the liquid crystal material 140 is nearly equal to the pressure exerted from the outside of the cell, because pressure equivalent to the atmospheric pressure, which is exerted from the surface of the liquid crystal tray 210, has been transferred to the pressure PLC of the liquid crystal material 140.

In a case of the ordinary liquid crystal panel in which the ultra-thin glass as adopted in the preferred embodiment 1 is not provided, a reactive force exerted from the inside of the cell includes a repulsive force caused by the cell structure itself constituted of the TFT substrate 110 and the CF substrate 120 bonded to each other with the seal pattern 130. This repulsive force hinders deformation against a deformation force that distorts the cell structure, and particularly, a force that causes deformation in the direction narrowing the distance between the TFT substrate 110 and the CF substrate 120, which raises the problem herein. However, in a case of adopting the ultra-thin glass as in the preferred embodiment 1, this repulsive force is extremely weak because of the degree of strength of the ultra-thin glass. Accordingly, in a case of the preferred embodiment 1, as already described, it substantially suffices that only the pressure PLC of the liquid crystal material 140 and the repulsive force exerted by the columnar spacers 133 are considered as the reactive force acting from the inside of the cell.

In the corner portion C1 located closer to the injection port 131, the loading of the liquid crystal material 140 is almost completed. Therefore, as shown in FIG. 8B, the above-described balance is maintained without causing much compressive deformation of the columnar spacers 133. On the other hand, in the corner portion C2 located farther from the injection port 131, the pressure PLC of the liquid crystal material 140 does not act as the reactive force in the frame region 101 where the liquid crystal material 140 is hardly loaded, and therefore the pressure Pat equivalent to the atmospheric pressure which is exerted from the outside of the cell is mostly held by the repulsive force caused by the compression of the columnar spacers 133. Accordingly, as shown in FIG. 7B, in the frame region 101 and therearound, all of the provided columnar spacers 133 (the columnar spacers (main) 133m, the columnar spacers (sub) 133s, and the columnar spacers (peripheral) 133d) are in contact with the TFT substrate 110 and the CF substrate 120, and furthermore compressively deformed, thereby keeping the balance.

Figure 9A:
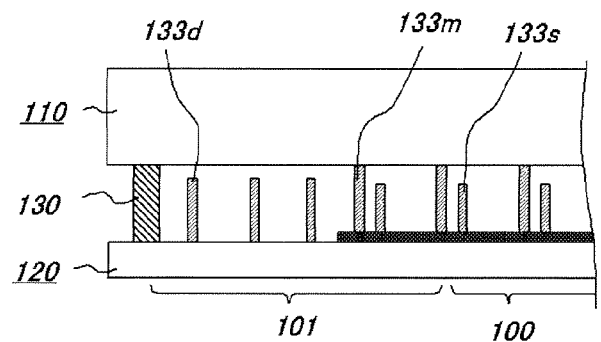
FIGS. 9A to 9C are cross-sectional views showing an area near a corner portion during the vacuum injection step in the process for manufacturing the liquid crystal panel according to the preferred embodiment 1 of the present invention.
Figure 9B:
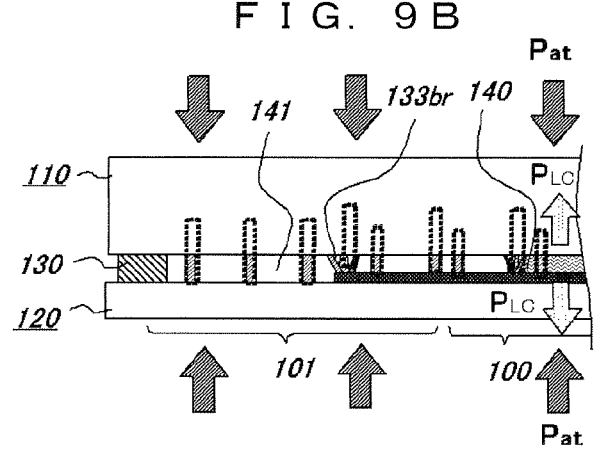
Figure 9C:
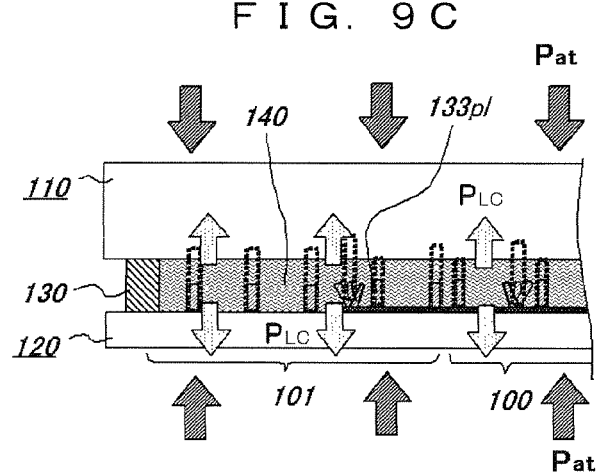

FIGS. 9A to 9C show a comparative example, which is an assumed case in which the liquid crystal injection step is performed under a state where the density of arrangement of the columnar spacers 133 in the corner portion C2 located farther from the injection port 131 is as relatively low as in the corner portion C1 located closer to the injection port 131. FIGS. 9A to 9C show the corner portion C2 in a case where the columnar spacers 133 are arranged at the relatively low density mentioned above. The states shown in FIGS. 9A to 9C correspond to the states shown in FIG. 7A to 7C that has been described in the preferred embodiment 1.

As has been described with reference to FIG. 7B, in the corner portion C2 located farther from the injection port 131, the pressure Pat equivalent to the atmospheric pressure which is exerted from the outside of the cell is mostly held by the repulsive force caused by the compression of the columnar spacers 133. Accordingly, in the frame region 101 and therearound, all of the provided columnar spacers 133 (the columnar spacers (main) 133m, the columnar spacers (sub) 133s, and the columnar spacers (peripheral) 133d) are in contact with the TFT substrate 110 and the CF substrate 120, and compressively deformed, thereby keeping the balance. In this respect, in a case where the columnar spacers 133 are arranged with a relatively low density as shown in FIG. 9B, the pressure Pat almost equivalent to the atmospheric pressure which is exerted from the outside of the cell concentrates to a small number of columnar spacers 133. As a result, the deformation of the columnar spacers 133 is larger than the state shown in FIG. 7B of the preferred embodiment 1.

For example, in FIG. 9B, the shape (height) of each columnar spacer 133 before the deformation is indicated by the dotted line. Particularly, the columnar spacers (main) 133m are deformed to the extent that the height thereof falls far below one half of the original height thereof. The other kinds of the columnar spacers 133 are deformed to the extent that the height thereof is reduced to about one half of the original height thereof. If a range of elastic deformation allowed for members constituting these columnar spacers 133 is 50% and the members cannot follow deformation and are destroyed or damaged when the deformation reaches a range of 60%, most of the columnar spacers 133 cause plastic deformation without falling within the elastic deformation range. Furthermore, part of the columnar spacers 133 that are largely deformed are consequently destroyed or damaged (the columnar spacer 133 that is destroyed or damaged is illustrated as a broken columnar spacer 133br). On the other hand, in FIG. 7B showing the corresponding state in the preferred embodiment 1, the columnar spacers 133 are arranged at a relatively high density, and therefore the pressure is dispersed among the columnar spacers 133. Thus, the amount of deformation falls below 50%, that is, within the elastic deformation range.

Then, at a time when the liquid crystal injection step is completed, as shown in FIGS. 7C and 8C, in both the corner portion C1 and the corner portion C2, the interior of the cell is filled with the liquid crystal material 140, and the pressure Pat equivalent to the atmospheric pressure and the pressure PLC of the liquid crystal material 140 are balanced, also in the frame region 101. Particularly, in the preferred embodiment 1, deformation of the columnar spacers 133 that have been once deformed is within the elastic deformation range. Therefore, when the compressed pressure is removed (released), these columnar spacers 133 almost recover their original height. That is, the predetermined gap determined and kept by the columnar spacers (main) 133m is recovered. In the comparative example, as shown in FIG. 9C, the columnar spacers 133 that have once caused plastic deformation, which is irreversible deformation, cannot recover their original height even if the loading of the liquid crystal material 140 is completed so that the pressure is removed (released) also in the frame region 101 (illustrated as a plastically deformed columnar spacer 133p1). Needless to say, the broken columnar spacer 133br that has been once broken cannot recover its original state. As a result, there is no spacer that properly holds the substrate in the vicinity of the frame region 101. This causes a gap failure, which means that the gap becomes narrower than the predetermined gap. Since this gap failure reaches the display region 100 near the frame region 101, unevenness occurs in the display. Even if the broken columnar spacer 133br is a columnar spacer 133 provided in the frame region 101 that does not directly contribute to the display, a constituent element of the broken columnar spacer 133br may, as an impurity, run into the liquid crystal to contaminate the liquid crystal, which results in a reduction in the reliability.

The range of elastic deformation allowed for the columnar spacers 133 and the amount of deformation that causes destruction or breaking, which have been adopted in the detailed description of the liquid crystal injection step given above with reference to FIGS. 7A to 9C, vary depending on the kind and shape of the resin that constitutes the columnar spacer 133 and heat treatment conditions under which the light-shielding layer is formed by sputtering in the parallax barrier formation step (S9) that is performed before the liquid crystal injection step. More specifically, the heat treatment conditions are related to the degree of degradation of the resin (because of the degradation of the resin, the elastic deformation range is narrowed and the amount of deformation that causes destruction or breaking is reduced). For convenience of the illustration, the amount of deformation that is shown as an example herein is a value adopted for the purpose of facilitating the description. Actually, plastic deformation, destruction, and the like, are caused with an amount of deformation that is much smaller than the amount of deformation illustrated herein. Particularly, the amount of deformation occurring in a case of the liquid crystal display device including the parallax barrier that is formed directly on the surface of the ultra-thin glass substrate, which will be subjected to the heat treatment in the parallax barrier formation step, is much smaller than the amount of deformation illustrated herein.

As thus far described above, in the liquid crystal display device according to the preferred embodiment 1, the density of arrangement of the columnar spacers 133 that function as spacer structures for keeping the distance between the substrates within a certain range at a time of injecting the liquid crystal is higher in the corner portion C2 located at a distance (farther) from the injection port 131 than in the corner portion C1 located closer to the injection port 131. This can prevent the columnar spacers 133 from being plastically deformed and destroyed or being damaged in the corner portion farther from the injection port 131, in a case where the liquid crystal display device including ultra-thin glass is manufactured through the liquid crystal injection method using the vacuum injection method. As a result, in manufacturing the dual-screen display, the liquid crystal injection method using the vacuum injection method, which particularly puts no restriction on designing of the light-shielding layer, is selectable. Additionally, since the columnar spacers 133 are not plastically deformed and destroyed or not damaged in the corner portion farther from the injection port 131, unevenness of the gap and a display failure due to an abnormal alignment do not occur in the corner portion. Moreover, since the columnar spacers 133 are not destroyed or damaged, the constituent element of the columnar spacers 133 do not run as an impurity into the liquid crystal, which otherwise contaminates the liquid crystal and reduces the reliability. Hence, the dual-screen display with a high reliability and an excellent display quality, that can be manufactured at a low cost and with a good yield of production, is obtained.

The above-described fundamental effects of the present invention can be obtained by the configuration in which the density of arrangement of the columnar spacers 133 is higher in the corner portion C2 located farther from the injection port 131 than in the corner portion C1 located closer to the injection port 131. However, for the purpose of a better configuration, the density of arrangement of the columnar spacers 133 in the corner portion C2 may be adjusted such that the amount of deformation of the columnar spacers 133 occurring when the atmospheric pressure which is the highest pressure is applied to the columnar spacers 133 is dispersed within the above-described range of elastic deformation of the columnar spacers 133. Here, it is desirable that no failure occurs in all the columnar spacers 133, though the amount of deformation varies among some of the arranged columnar spacers 133. Therefore, a situation where the amount of deformation of the columnar spacers 133 falls within the elastic deformation range is equivalent to a situation where the amount of deformation of all the columnar spacers 133 falls within the elastic deformation range, and also equivalent to a situation where the amount of deformation of at least the columnar spacer 133 that is most largely deformed falls within the elastic deformation range. Characteristics concerning the elastic deformation range of the columnar spacers 133 used for the adjustment herein may be based on the characteristics obtained immediately before the liquid crystal injection step, that is, the characteristics obtained after the degradation caused by a thermal history that the columnar spacers 133 have undergone before the liquid crystal injection step.

Since an appropriate density of arrangement (the number of columnar spacers 133 arranged per unit area) varies depending on the cross-sectional area of the columnar spacer 133, it is proper to consider that the density of arrangement recited herein is substantially the area density. In other words, the effects of the present invention can be obtained by a configuration in which, in terms of the area density, the density of arrangement of the columnar spacers 133 is higher in the corner portion C2 located farther from the injection port 131 than in the corner portion C1 located closer to the injection port 131.

Figure 10:
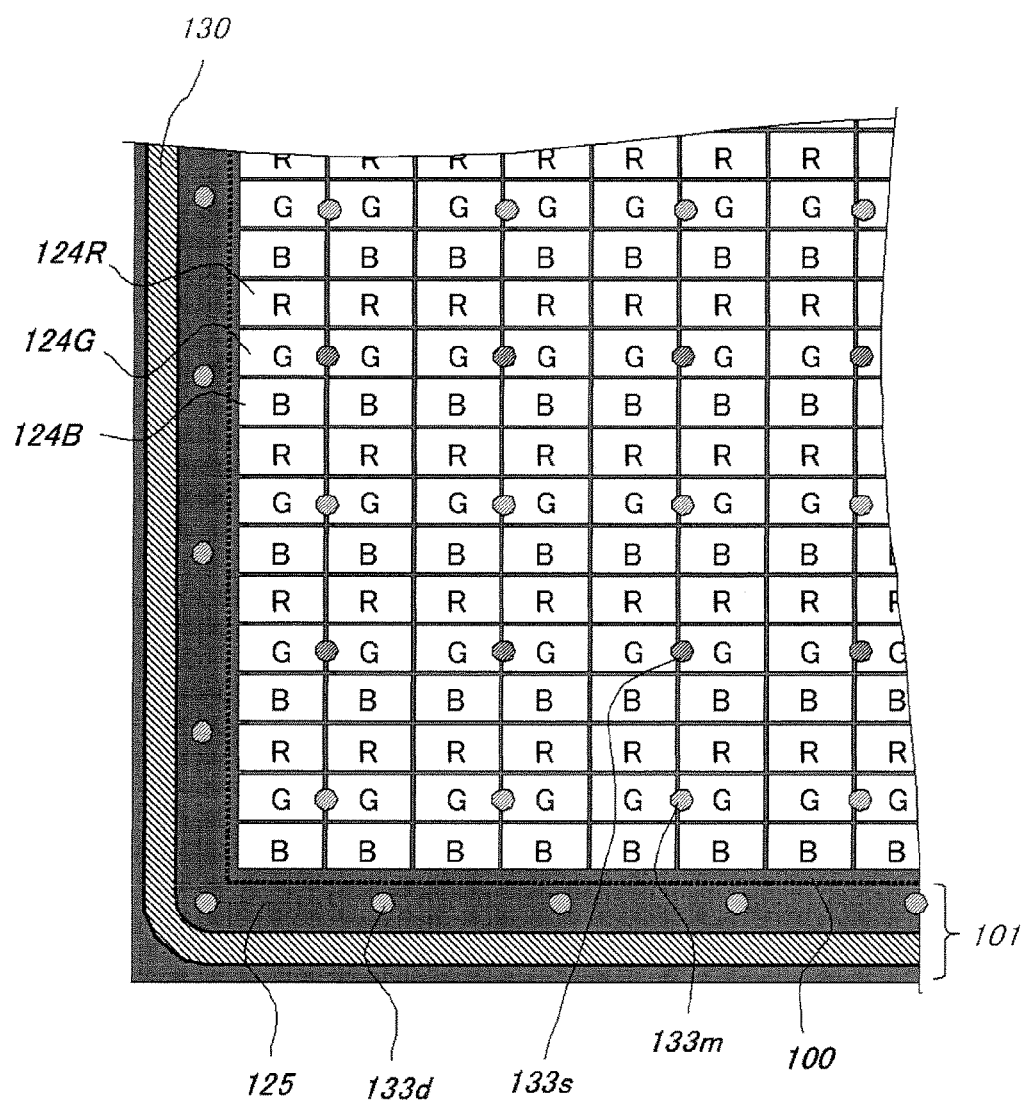
FIG. 10 is a plan view showing an area near a corner portion of a CF substrate according to a modification of the preferred embodiment 1 of the present invention.
Figure 11:
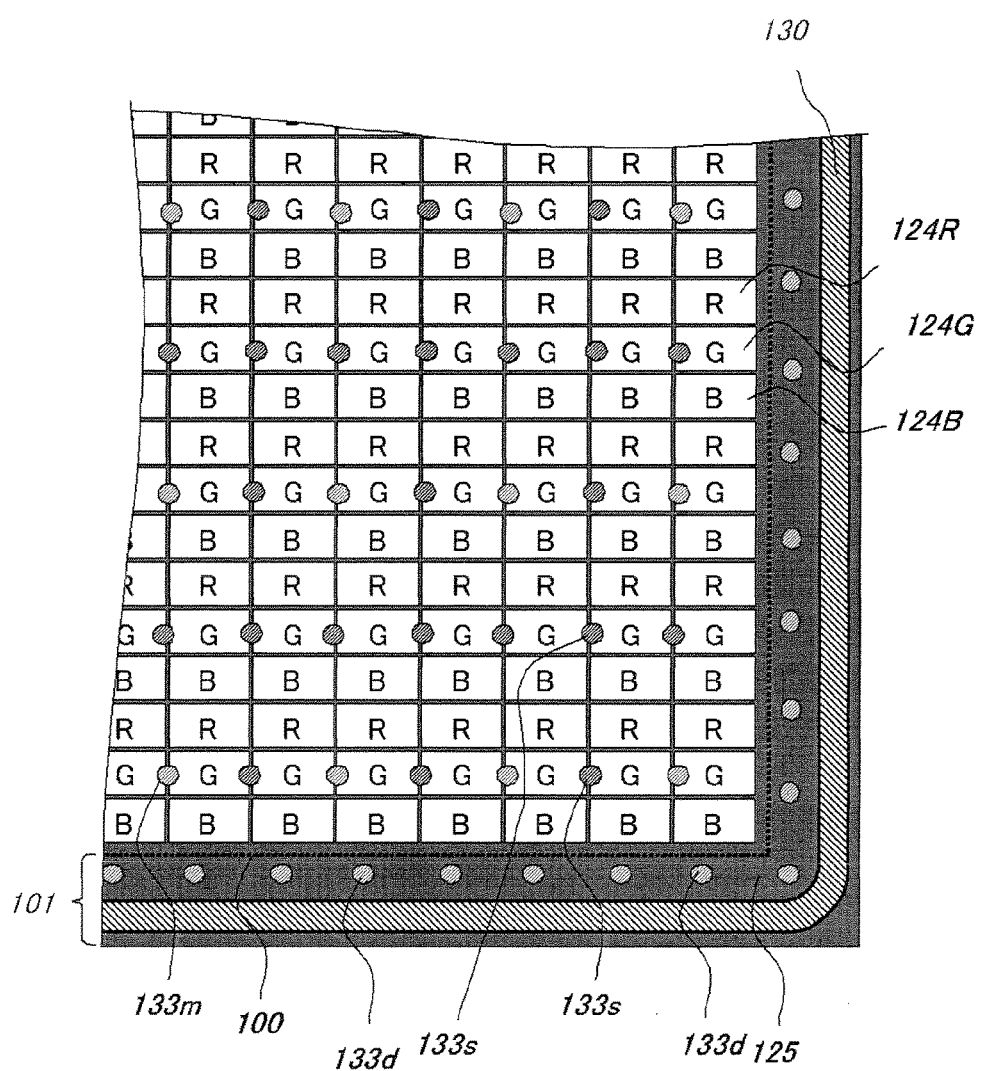
FIG. 11 is a plan view showing an area near a corner portion of the CF substrate according to the modification of the preferred embodiment 1 of the present invention.

Next, one modification of the preferred embodiment 1 will be described with reference to FIGS. 10 and 11 (showing the areas corresponding to FIGS. 3 and 4 of the preferred embodiment 1, respectively). In setting the density of arrangement of the columnar spacers 133 higher in the corner portion C2 located farther from the injection port 131 as disclosed in the present invention, it is necessary to consider the following. That is, in an ordinary liquid crystal panel in which substrates are maintained by columnar spacers, excessively increasing the density of columnar spacers (main) that are in contact with both a TFT substrate and a CF substrate and thereby maintain them is likely to cause a phenomenon (called low-temperature foaming) in which foams are generated when the liquid crystal panel is exposed to a low temperature, a phenomenon (called a lower bulging phenomenon or an uneven gravity phenomenon) in which, when exposed to a high temperature, the gap bulges in a lower region of the liquid crystal panel that is operated in the upright state, so that unevenness occurs in the display.

In the present invention, on the other hand, it suffices that the gap between the TFT substrate 110 and the CF substrate 120 is kept, that is, the pressure is dispersed, when the distance between the TFT substrate 110 and the CF substrate 120 is narrowed to some extent because of the atmospheric pressure being applied to the surfaces of the substrates. Therefore, it is not always necessary that the columnar spacers (main) 133m are constantly in contact with both the TFT substrate 110 and the CF substrate 120 and maintain them. Instead, any of the configurations of the columnar spacers (main) 133m, the columnar spacers (sub) 133s, and the columnar spacers (peripheral) 133d, which effectively function as spacer structures for keeping the distance between the substrates within a certain range when the distance between the substrates is narrowed at a time of injecting the liquid crystal, is acceptable. It suffices that the density of arrangement is increased by using the columnar spacers 133 having any of these configurations. Accordingly, in this modification, in the corner portion C2, the following arrangement is adopted. That is, in the frame region 101, the density of the columnar spacers (peripheral) 133d is increased similarly to the preferred embodiment 1, and in the display region 100, the columnar spacers (main) 133m are arranged at a constant density in the corner portion C1 or in the entire display region 100 while only the columnar spacers (sub) 133s are arranged at an increased density, as shown in FIGS. 10 and 11.

In this manner, as described above, the following configuration enables the fundamental effects of the present invention to be obtained without increasing a failure such as the low-temperature foaming and the lower bulging which are caused by an increase in the density of the columnar spacers (main) 133m that are constantly in contact with the TFT substrate 110 and the CF substrate 120 and thereby maintain the TFT substrate 110 and the CF substrate 120. That is, in increasing the density of arrangement of the columnar spacers 133 in the corner portion C2 located farther from the injection port 131, the columnar spacers (main) 133m that are constantly in contact with both of the TFT substrate 110 and the CF substrate 120 and thereby maintain the TFT substrate 110 and the CF substrate 120 are arranged at a constant density in both of the corner portion C2 and the corner portion C1. On the other hand, the columnar spacers that are formed with a height lower than the columnar spacers (main) 133m or that are in contact with only one of the TFT substrate 110 and the CF substrate 120 in the normal state while coming into contact with both of the TFT substrate 110 and the CF substrate 120 to maintain the inter-substrate gap only under a state where the TFT substrate 110 and the CF substrate 120 are brought closer to each other within the range of elastic deformation of the columnar spacers (main) 133m, are arranged at an increased density in the corner portion C2 as compared with in the corner portion C1. More specifically, the columnar spacers (sub) 133*s* or the columnar spacers (peripheral) 133*d* are arranged at an increased density in the corner portion C2.

In arranging the columnar spacers 133 at an increased density (area density) in the corner portion C2 located farther from the injection port 131, unlike the preferred embodiment 1, it is not necessary that the adjustment of the density (area density) of arrangement is achieved only by any of the spacer structures of the columnar spacers (main) 133*m*, the columnar spacers (sub) 133*s*, and the columnar spacers (peripheral) 133*d*, which are also arranged in the corner portion C1 located closer to the injection port 131. A special spacer structure having a different shape or form from that of the columnar spacer (main) 133*m*, the columnar spacer (sub) 133*s*, and the columnar spacer (peripheral) 133*d* may be additionally provided in the corner portion C2 as appropriate, as long as the special spacer structure is configured to keep the distance between the substrates within a certain range. In such a case as well, the same effects as those of the preferred embodiment 1 can be obtained. Next, some modifications will be sequentially described with reference to FIGS. 12, 13A, and 13B. In each of the modifications, spacer structures having a different shape or form from that of the preferred embodiment 1 are additionally provided in the corner portion C2, for keeping the space between the substrates.

Figure 12:
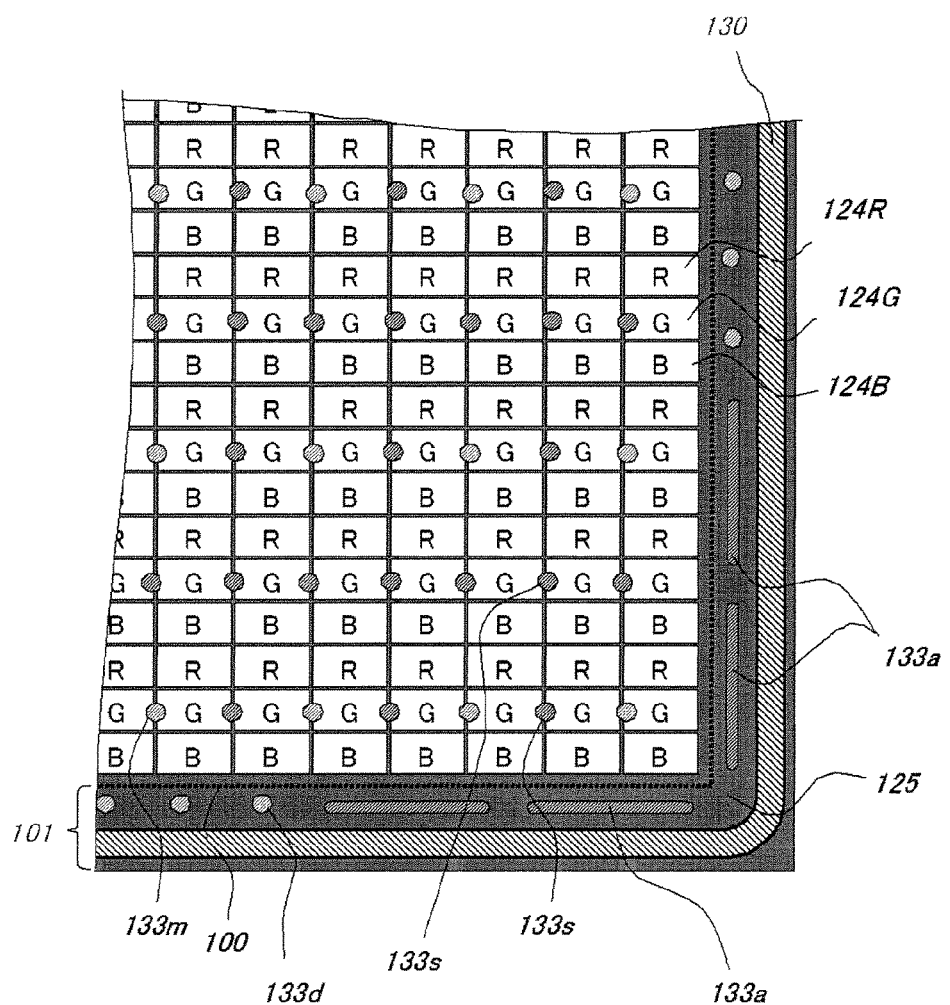
FIG. 12 is a plan view showing an area near a corner portion of a CF substrate according to a modification of the preferred embodiment 1 of the present invention.

Firstly, as shown in FIG. 12, as spacer structures that are additionally provided for the purpose of increasing the density (area density) of arrangement of the columnar spacers 133 in the corner portion C2 to thereby keep the space between the substrates, bank-shaped spacers 133*a* may be provided in the vicinity of the corner portion C2, and particularly in the frame region 101. The bank-shaped spacer 133*a* is formed so as to extend over a certain length. Such a bank-shaped spacer 133*a* has not only a function for simply increasing the area density but also an excellent strength. This provides a higher effect in dispersing the pressure applied to the other columnar spacers 133 and the like. However, if a flow of the liquid crystal toward the corner portion C2, which is relatively slowed, is hindered when the liquid crystal is loaded, loading of the liquid crystal into the corner portion C2 is delayed. As a result, the outside reaches the atmospheric pressure while a large region is not yet filled with the liquid crystal. That is, a region that requires the dispersion of the pressure is enlarged, which weakens the effect obtained by additionally providing the spacer structures for keeping the space between the substrates. Therefore, it is desirable that, as shown in FIG. 12, the bank-shaped spacer 133*a* is divided in the corner portion so that an opening is formed in a corner portion direction (a diagonal direction toward the corner portion). Such a pattern structure allows the liquid crystal to flow in the corner portion direction through the opening. This, hindrance to the flow of the liquid crystal toward the corner portion C2 can be minimized It is desirable that, similarly to the columnar spacers (sub) 133*s* provided in the frame region 101 in the preferred embodiment 1, the bank-shaped spacer 133*a* has a height lower than the columnar spacers (main) 133*m*, to further reduce the hindrance to the flow of the liquid crystal toward the corner portion C2.

Figure 13A:
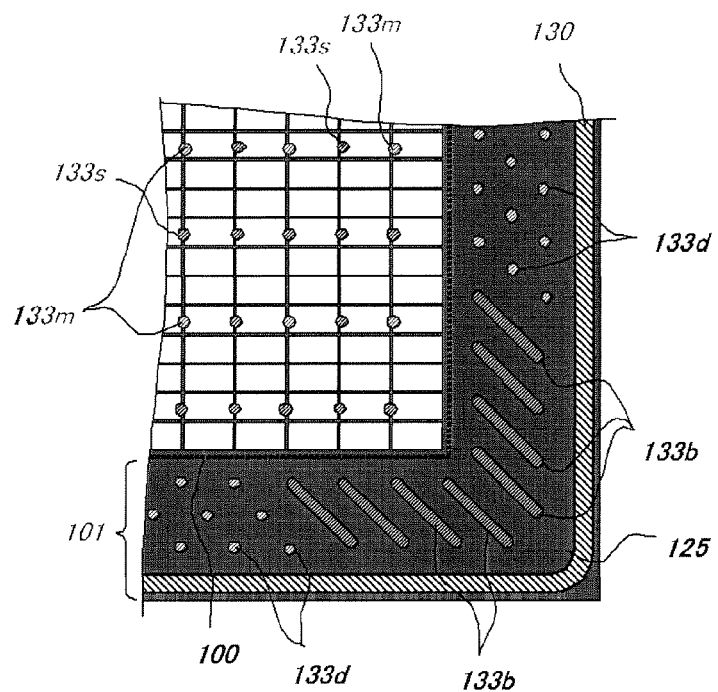
FIGS. 13A and 13B are plan views showing an area near a corner portion of a CF substrate according to a modification of the preferred embodiment 1 of the present invention.

From the same viewpoint, as the spacer structures that are additionally provided for the purpose of increasing the density (area density) of arrangement of the columnar spacers 133 in the corner portion C2 to thereby keep the space between the substrates, bank-shaped spacers 133*b* may be provided in the vicinity of the corner portion C2, and particularly in the frame region 101, such that the bank-shaped spacers 133*b* are arranged along a corner diagonal direction with their longitudinal sides extending in parallel with one another, as illustrated in a modification shown in FIG. 13A. This configuration is more excellent in the function for not hindering the flow of the liquid crystal toward the corner portion C2, as compared with the configuration shown in FIG. 12. Thus, loading of the liquid crystal into the corner portion C2 proceeds quickly. Additionally, since the bank-shaped spacers 133*b* are arranged in the corner portion C2, an excellent reinforcing effect is obtained. Similarly to the configuration shown in FIG. 12, it is desirable that the bank-shaped spacer 133*b* arranged along the corner diagonal direction has a height lower than the columnar spacers (main) 133*m*, to further reduce the hindrance to the flow of the liquid crystal toward the corner portion C2.

Figure 13B:
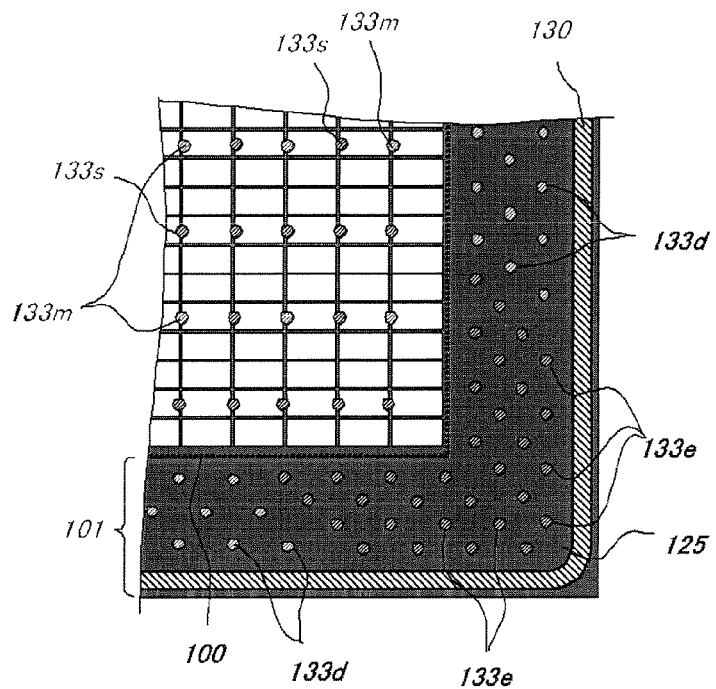

In another modification, as shown in FIG. 13B, as the spacer structures that are additionally provided for the purpose of increasing the density (area density) of arrangement of the columnar spacers 133 in the corner portion C2 to thereby keep the space between the substrates, columnar spacers (peripheral) 133*e* having a circular shape (columnar shape) may be densely arranged in the corner portion C2. This configuration is also excellent in the function for not hindering the flow of the liquid crystal toward the corner portion C2. Thus, loading of the liquid crystal into the corner portion C2 proceeds quickly. Additionally, since the columnar spacers (peripheral) 133*e* are arranged densely to some extent in the corner portion C2, an excellent reinforcing effect is obtained. Moreover, similarly to the configuration shown in FIG. 12, it is desirable that the circular columnar spacers (peripheral) 133*e* arranged densely in the corner portion C2 has a height lower than the columnar spacers (main) 133*m*, to further reduce the hindrance to the flow of the liquid crystal toward the corner portion C2.

In the preferred embodiment 1 and modifications, in a case where the columnar spacers (sub) 133*s*, the columnar spacers (peripheral) 133*d*, the bank-shaped spacers 133*a*, the bank-shaped spacer 133*b*, and the circular columnar spacers (peripheral) 133*e*, which are provided as the spacer structures for keeping the space between the substrates and which cooperate with the columnar spacers (main) 133*m* to adjust the density (area density) of arrangement, are formed with a height lower than the columnar spacers (main) 133*m*, the height of the columnar spacers (sub) 133*s* of the preferred embodiment 1 is set to be about 85% of the height of the columnar spacers (main) 133*m*. That is, at a time point when the columnar spacers (main) 133*m* are compressed so that the height decreases by 15%, the columnar spacers (main) 133*m* and the columnar spacers (sub) 133*s* have almost the same height. When a further pressure is applied in a compression direction, the applied pressure is dispersed among the columnar spacers (main) 133*m* and the columnar spacers (sub) 133*s*. Although the degree of lowness of the height has not been specifically mentioned for the other columnar spacers (peripheral) 133*d*, bank-shaped spacers 133*a*, bank-shaped spacers 133*b*, and circular columnar spacers (peripheral) 133*e*, there is no problem in setting the height thereof in the same manner as the height of the columnar spacers (sub) 133*s*, because it is a prerequisite that the height thereof falls within the range of elastic deformation of the columnar spacers (main) 133*m* caused in response to the compression.

As for the columnar spacers (sub) 133*s*, the columnar spacers (peripheral) 133*d*, the bank-shaped spacers 133*a*, the bank-shaped spacers 133*b*, and the circular columnar spacers 133*e*, which cooperate with the columnar spacers (main) 133*m* to adjust the density (area density) of arrangement, an allowable height (the degree of lowness of the height) for effectively exerting the function as the spacer structures for keeping the space between the substrates at a time of injecting the liquid crystal particularly without causing any failure is as follows. That is, when a difference from the height of the columnar spacers (main) 133m is within the range of elastic deformation of at least the columnar spacers (main) 133m caused in response to the compression; before the columnar spacers (main) 133m are plastically deformed and destroyed, the spacer structures for keeping the space between the substrates disperse the applied pressure, and thus the pressure applied to the columnar spacers (main) 133m can be reduced. That is, the columnar spacers (sub) 133s, the columnar spacers (peripheral) 133d, the bank-shaped spacers 133a, the bank-shaped spacers 133b, and the circular columnar spacers 133e, as well as the columnar spacers (main) 133m, effectively function as the spacer structures for keeping the space between the substrates at a time of injecting the liquid crystal without causing any failure, and adjust the density (area density) of arrangement. Thereby, the effects of the present invention are exerted.

Accordingly, whether or not the spacers effectively function as the spacer structures for keeping the space between the substrates at a time of injecting the liquid crystal is determined in accordance with the range of elastic deformation of the columnar spacers (main) 133m. For example, when the range of elastic deformation is relatively large, a lower height may be adopted as the height of the columnar spacers (sub) 133s, the columnar spacers (peripheral) 133d, the bank-shaped spacers 133a, the bank-shaped spacers 133b, and the circular columnar spacers 133e. In a case where the columnar spacers (main) 133m are made of an ordinary photosensitive resin, the degree of lowness that is set for the columnar spacers (sub) 133s of the preferred embodiment 1 is acceptable.

In the preferred embodiment 1 and modifications, any of the columnar spacers (main) 133m, the columnar spacers (sub) 133s, the columnar spacers (peripheral) 133d, the bank-shaped spacers 133a, the bank-shaped spacers 133b, and the circular columnar spacers 133e function as the spacer structures for keeping the distance between the substrates within a predetermined certain range. Here, as the predetermined certain range, the upper limit of the distance between the substrates is equivalent to the original height of the columnar spacers (main) 133m, that is, the height of the columnar spacers (main) 133m that are not deformed. On the other hand, the lower limit of the distance between the substrates can be considered as being equivalent to the height of the spacer structure under a state where the space between the substrates is the narrowest in each position at a time of injecting the liquid crystal. The spacer structures that are formed with a height lower than the columnar spacers (main) 133m and that come into contact with both of the TFT substrate 110 and the CF substrate 120 to maintain the inter-substrate gap only under a state where the TFT substrate 110 and the CF substrate 120 are brought closer to each other at a time of injecting the liquid crystal, contribute only to the determination of the lower limit of the predetermined certain range. It is desirable that, when the spacer structures for keeping the distance between the substrates within the predetermined certain range, such as the columnar spacers (main) 133m, the columnar spacers (sub) 133s, the columnar spacers (peripheral) 133d, the bank-shaped spacers 133a, the bank-shaped spacers 133b, and the circular columnar spacers 133e, keep the distance between the substrates at the lower limit within the predetermined certain range, the heights of all the spacer structures are within the range of elastic deformation. This may be achieved by adjusting the density of arrangement of these spacer structures.

In the preferred embodiment 1 and modifications, both the columnar spacer (main) 133m and the columnar spacer (sub) 133s are integrated members. Instead, for example, the following is acceptable. That is, the columnar spacers (main) 133m include a resin pattern having a columnar shape provided on the CF substrate 120 and a metal film pattern provided on the TFT substrate 110 that are in contact with each other. In other words, the columnar spacers (main) 133m are constituted of two kinds of members. On the other hand, the columnar spacers (sub) 133s include only the resin pattern having the columnar shape that constitutes the columnar spacer (main) 133m, and thereby the columnar spacers (sub) 133s are formed with a lower height. In such a case, the height of the columnar spacers (sub) 133s is lower than the height of the columnar spacers (main) 133m by a difference between the presence and absence of the metal film pattern, that is, by the thickness of the metal film pattern.

In the preferred embodiment 1 and modifications, exemplary applications of the present invention to the dual-screen display liquid crystal panel in which only one of substrates is made of ultra-thin glass has been described. In the present invention, when at least either one of the substrates is made of ultra-thin glass, the same effect is obtained. Therefore, ply the present invention is applicable to, for example, a curved display in which ultra-thin glass is used for both of the TFT substrate and the CF substrate or to a reflection type display in which ultra-thin glass is used for one of the substrates.

Furthermore, in the description of the preferred embodiment 1 and modifications, a typical thickness of the substrate considered as ultra-thin glass is about 0.1 mm However, the effects described in the preferred embodiment 1 and modifications are obtained in a significant manner in a liquid crystal display device including an ultra-thin glass substrate with a thickness of about less than 0.2 mm, as compared with an ordinary liquid crystal display device including an ultra-thin glass substrate having a thickness of about 0.3 mm Regarding the lower limit, it is considered that the lower limit thickness of the glass substrate that is used in liquid crystal display devices described in the related art document is equal to or larger than 0.01 mm Accordingly, by the term "ultra-thin glass" used in this specification, glass having a substrate thickness equal to or more than 0.01 mm and less than 0.2 mm is defined. The term "ultra-thin glass" described herein has this meaning. From the above, the effects of the preferred embodiment 1 and modifications are achieved not only by ultra-thin glass of about 0.1 mm as illustrated in the preferred embodiment 1 and modifications but also by ultra-thin glass having a substrate thickness equal to or more than 0.01 mm and less than 0.2 mm While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
    a pair of glass substrates, at least one of said substrates being an ultra-thin glass substrate;
    a liquid crystal material interposed between said pair of glass substrates;
    a display region corresponding to a display surface that displays an image when the liquid crystal display device operates; and a seal pattern for bonding said pair of glass substrates to each other, said seal pattern having an injection port that is an opening through which said liquid crystal material is injected, wherein spacer structures for keeping the distance between said pair of glass substrates within a certain range are arranged such that the area density of said spacer structures is higher in a corner portion located at a side opposed to a side where said injection port is provided than in a corner portion located at the side where said injection port is provided, said spacer structures include:
   main columnar spacers that are constantly in contact with both of said pair of glass substrates to maintain said pair of glass substrates; and
   sub columnar spacers that are in contact with only one of said pair of glass substrates in a normal state and that come into contact with both of said pair of glass substrates to maintain a space between said substrates only under a state where said pair of glass substrates are brought closer to each other within a range of elastic deformation of said main columnar spacers, said main columnar spacers are arranged at a constant density in said display region, and said sub columnar spacers are arranged such that the area density thereof in the corner portion located at the side opposed to the side where said injection port is provided is higher than the area density thereof in the corner portion located at the side where said injection port is provided.

2. The liquid crystal display device according to claim 1, further comprising a parallax barrier that is formed directly on a surface of said ultra-thin glass substrate.

3. The liquid crystal display device according to claim 1, wherein said constant density is a number of spacers per pixel.

4. The liquid crystal display device according to claim 1, wherein said constant density is uniform across an entirety of said display region.

5. The liquid crystal display device according to claim 1, wherein said constant density is a number of spacers per pixel, and said constant density is uniform across an entirety of said display region.

* * * * *